(12) United States Patent
Yamaguchi et al.

(10) Patent No.: US 10,281,932 B2
(45) Date of Patent: May 7, 2019

(54) OPERATING DEVICE, AND THREE-DIMENSIONAL MOVEMENT APPARATUS

(71) Applicant: GOGOU CO., LTD., Aichi (JP)

(72) Inventors: Fujioki Yamaguchi, Aichi (JP); Kouji Ogawa, Aichi (JP)

(73) Assignee: GOGOU CO., LTD., Aichi (JP)

( * ) Notice: Subject to any disclaimer, the term of this patent is extended or adjusted under 35 U.S.C. 154(b) by 382 days.

(21) Appl. No.: 15/064,181

(22) Filed: Mar. 8, 2016

(65) Prior Publication Data

US 2016/0259347 A1  Sep. 8, 2016

Related U.S. Application Data

(60) Continuation of application No. 14/154,167, filed on Jan. 13, 2014, now Pat. No. 9,284,163, which is a
(Continued)

(30) Foreign Application Priority Data

Feb. 14, 2007 (JP) ................. 2007-034170

(51) Int. Cl.
*B66C 19/00* (2006.01)
*B66C 13/06* (2006.01)
(Continued)

(52) U.S. Cl.
CPC ............... *G05D 3/10* (2013.01); *B66C 13/40* (2013.01); *B66C 13/44* (2013.01); *G05B 15/02* (2013.01)

(58) Field of Classification Search
CPC ....... B66C 23/005; B66C 13/40; B66C 13/00; B66C 13/56; B66D 3/18; G05D 3/10; H01H 9/02; H01H 9/0214
See application file for complete search history.

(56) References Cited

U.S. PATENT DOCUMENTS 4,635,802 A * 1/1987 Hylton ................... B66C 13/56
212/285
4,664,873 A 5/1987 Hendrich et al.
(Continued)

FOREIGN PATENT DOCUMENTS

JP  S48-43563 U  6/1973
JP  S60-87196 A  5/1985
(Continued)

OTHER PUBLICATIONS

Machine translation of JP 6-50458 Y2.*
(Continued)

*Primary Examiner* — Brian Turner
(74) *Attorney, Agent, or Firm* — Withrow & Terranova, P.L.L.C.; Vincent K. Gustafson

(57) ABSTRACT

In a movement control apparatus manipulation can be carried out while watching the movement of the moving body, without needing to watch one's hands, so even a novice operator can perform the manipulation easily, safely, reliably, and quickly. The apparatus can include a signal transmission cable, a casing of a manipulation remote controller disposed at one end of the cable, a rotary encoder that produces a signal corresponding to the direction of the casing, and a motor drive control circuit that is disposed on the other side of the cable and controls the movement of a moving body on the basis of a signal corresponding to the direction of the casing. The signal corresponding to the direction of the casing can be supplied from the rotary encoder, through the cable, to the motor drive control circuit. Therefore, the operator can hold down a manipulation switch without looking at his hands and thereby adjust the direction of the casing of the manipulation remote controller while looking at the movement direction of a load.

16 Claims, 19 Drawing Sheets

Related U.S. Application Data division of application No. 12/527,421, filed as application No. PCT/JP2008/000226 on Feb. 14, 2008, now abandoned.

(51) Int. Cl.
| | |
|---|---|
| *B66C 13/44* | (2006.01) |
| *G05D 3/00* | (2006.01) |
| *B66C 13/16* | (2006.01) |
| *B66C 13/56* | (2006.01) |
| *G05D 3/10* | (2006.01) |
| *B66C 13/40* | (2006.01) |
| *G05B 15/02* | (2006.01) |

(56) References Cited

U.S. PATENT DOCUMENTS

| | | | |
|---|---|---|---|
| 4,830,703 | A | 5/1989 | Matsutani |
| 5,016,199 | A | 5/1991 | McMurtry et al. |
| 5,038,144 | A | 8/1991 | Kaye |
| 5,160,239 | A | 11/1992 | Allen et al. |
| 5,398,825 | A | 3/1995 | Erwin |
| 7,070,061 | B1 | 7/2006 | Munnekehoff |
| 7,959,557 | B2 | 6/2011 | Weitzner et al. |
| 9,284,163 | B2 | 3/2016 | Yamaguchi et al. |
| 2002/0178624 | A1* | 12/2002 | Yamamoto ............ E02F 9/2004 37/348 |
| 2004/0026348 | A1 | 2/2004 | Shaw |
| 2005/0033835 | A1 | 2/2005 | Kinjo |
| 2006/0226106 | A1* | 10/2006 | Zaguroli, Jr. ............ B66C 9/14 212/331 |
| 2007/0249280 | A1 | 10/2007 | Johnson |
| 2007/0291112 | A1 | 12/2007 | Harris |
| 2009/0145871 | A1 | 6/2009 | Bond |
| 2010/0145526 | A1 | 6/2010 | Yamaguchi et al. |
| 2014/0232208 | A1 | 8/2014 | Yamaguchi et al. |

FOREIGN PATENT DOCUMENTS

| | | |
|---|---|---|
| JP | S61-44797 A | 3/1986 |
| JP | 4-69175 A | 3/1992 |
| JP | 5-331873 A | 12/1993 |
| JP | 6-31982 U | 4/1994 |
| JP | 6-50458 Y2 | 12/1994 |
| JP | H11-106179 A | 4/1999 |
| JP | 2004-75284 A | 3/2004 |
| JP | 2005-89051 A | 4/2005 |
| JP | 2005-334999 A | 12/2005 |
| JP | 2007039232 A | 2/2007 |

OTHER PUBLICATIONS

International Search Report for PCT/JP2008/000226 dated May 13, 2008.
Translation of International Preliminary Report on Patentability for International Patent Application No. PCT/JP2008/000226, dated Aug. 19, 2009, 5 pages.
Examination Report (Communication pursuant to Article 94(3) EPC) for European Patent Application No. 08710380.0, dated Sep. 10, 2014, 4 pages.
Extended European Search Report for European Patent Application No. 08710380.0, dated Jun. 12, 2013, 9 pages.
Chinese Office Action for Chinese Patent Application No. 200880009000.0 dated Dec. 20, 2011, 12 pages.
Office Action for Chinese Patent Application No. 200880009000.0, dated Mar. 28, 2013, 12 pages.
Office Action for Chinese Patent Application No. 201310306698.5, dated Aug. 28, 2015, 11 pages.
Office Action for Japanese Patent Application No. 2008-558011, dated Jul. 27, 2011, 4 pages.
Office Action for Japanese Patent Application No. 2011-207800, dated Nov. 24, 2011, 4 pages.
Office Action for Japanese Patent Application No. 2011-122482, dated May 20, 2013, 6 pages.
Office Action for Japanese Patent Application No. 2011-122482, dated Apr. 2, 2014, 6 pages.
Office Action for Korean Patent Application No. 10-2009-7016872, dated Jan. 28, 2015, 12 pages.
Office Action for Korean Patent Application No. 10-2009-7016872, dated Apr. 30, 2014, 5 pages.
Office Action (Notice of Final Rejection) for Korean Patent Application No. 10-2009-7016872, dated Sep. 25, 2015, 6 pages.
Notice of Allowance for U.S. Appl. No. 14/154,167, dated Jul. 1, 2015, 9 pages.
Notice of Allowance for U.S. Appl. No. 14/154,167, dated Oct. 30, 2015, 9 pages.
Office Action for Chinese Patent Application No. 201310306698.5, dated Jul. 19, 2016, 20 pages.

\* cited by examiner

F I G. 5
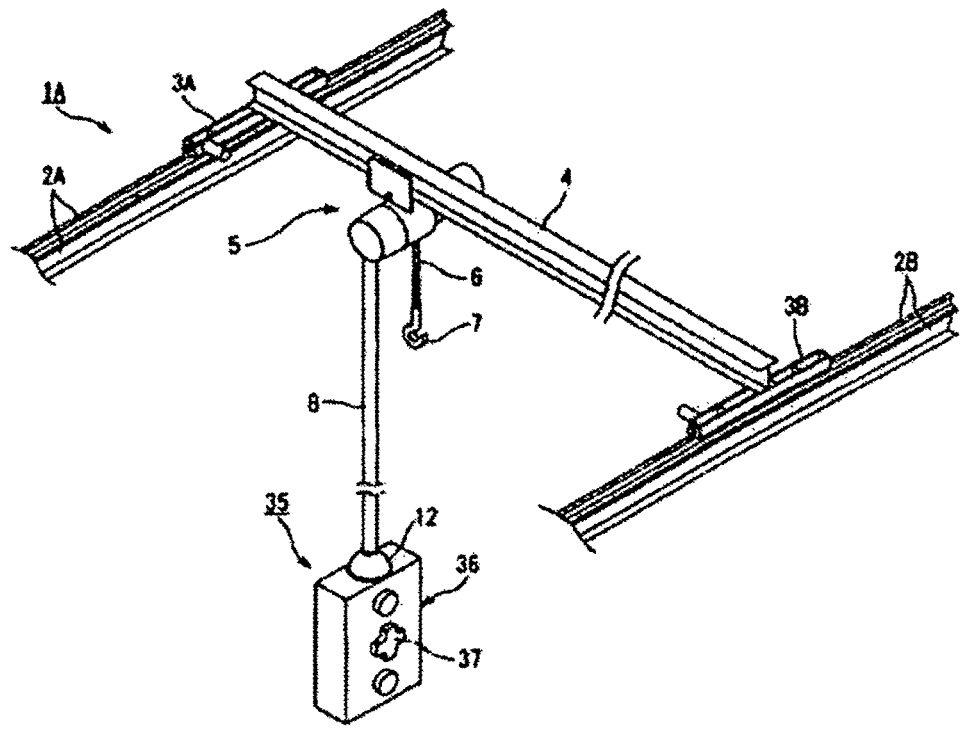
F I G. 6
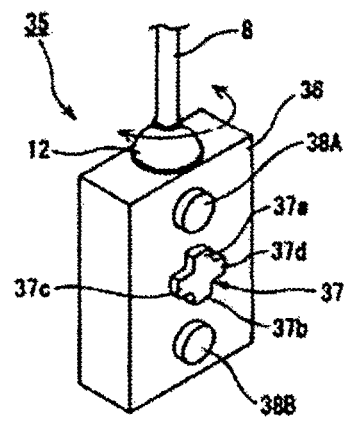

F I G. 7
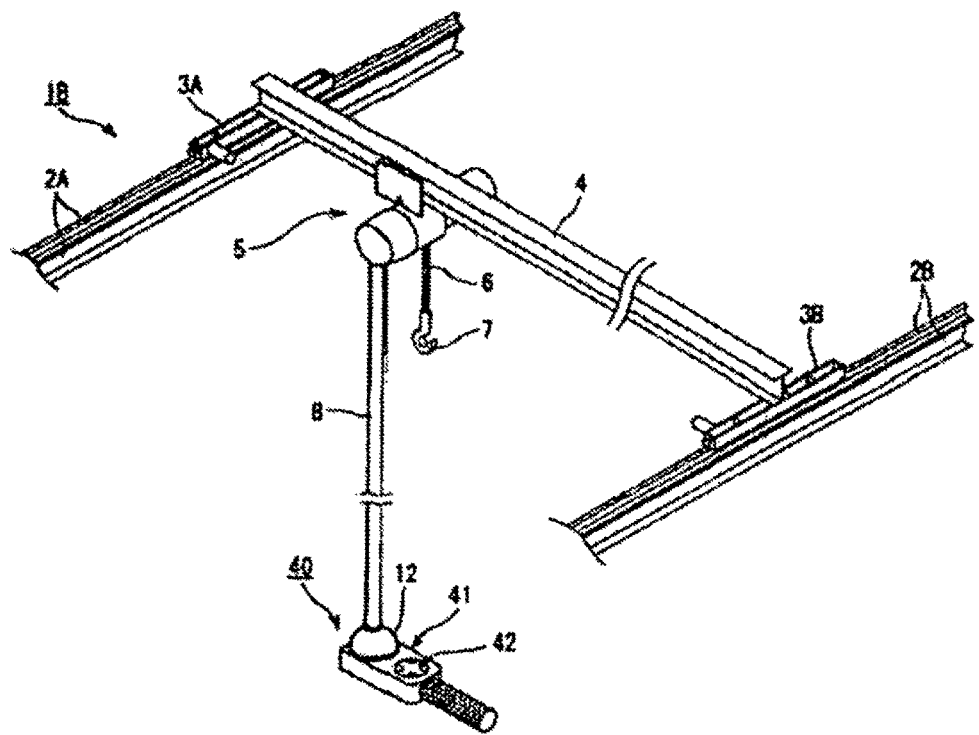

FIG. 12
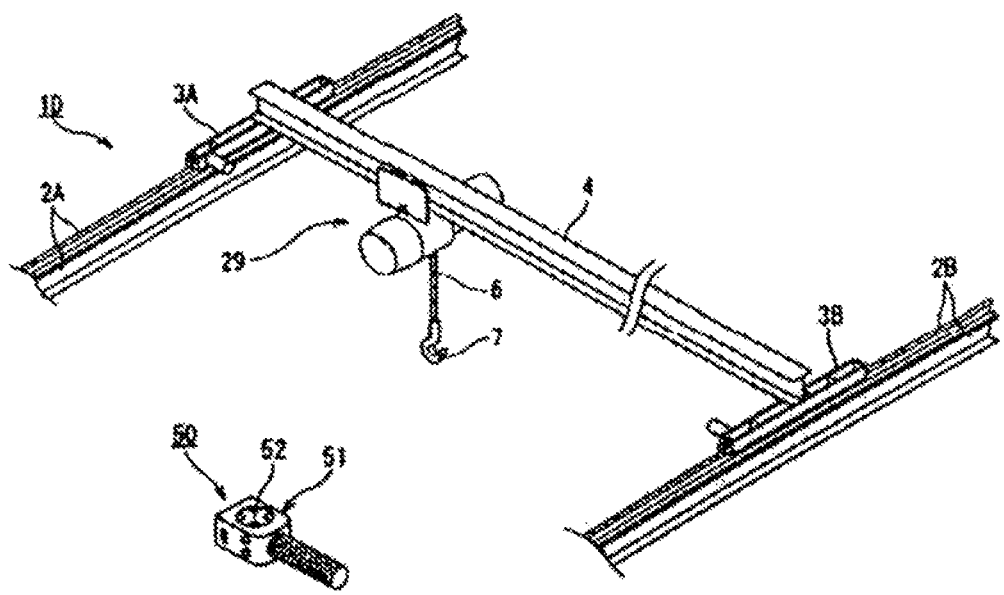
FIG. 13A
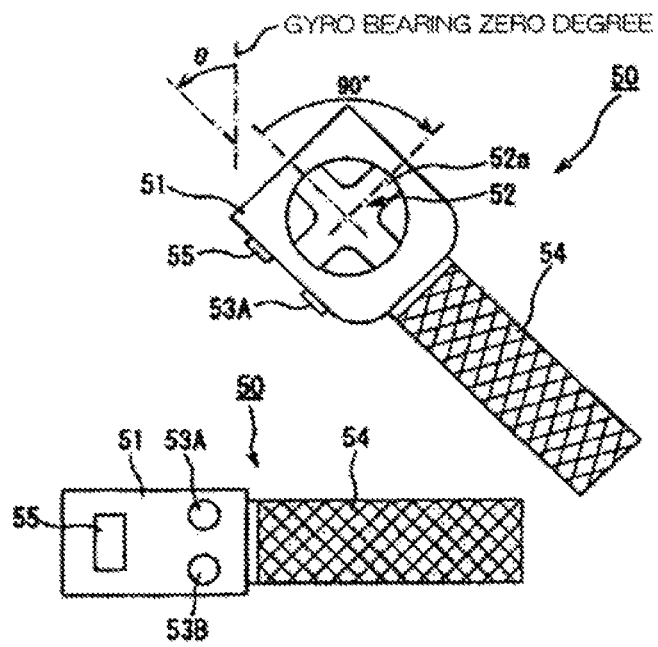
FIG. 13B

F I G.14
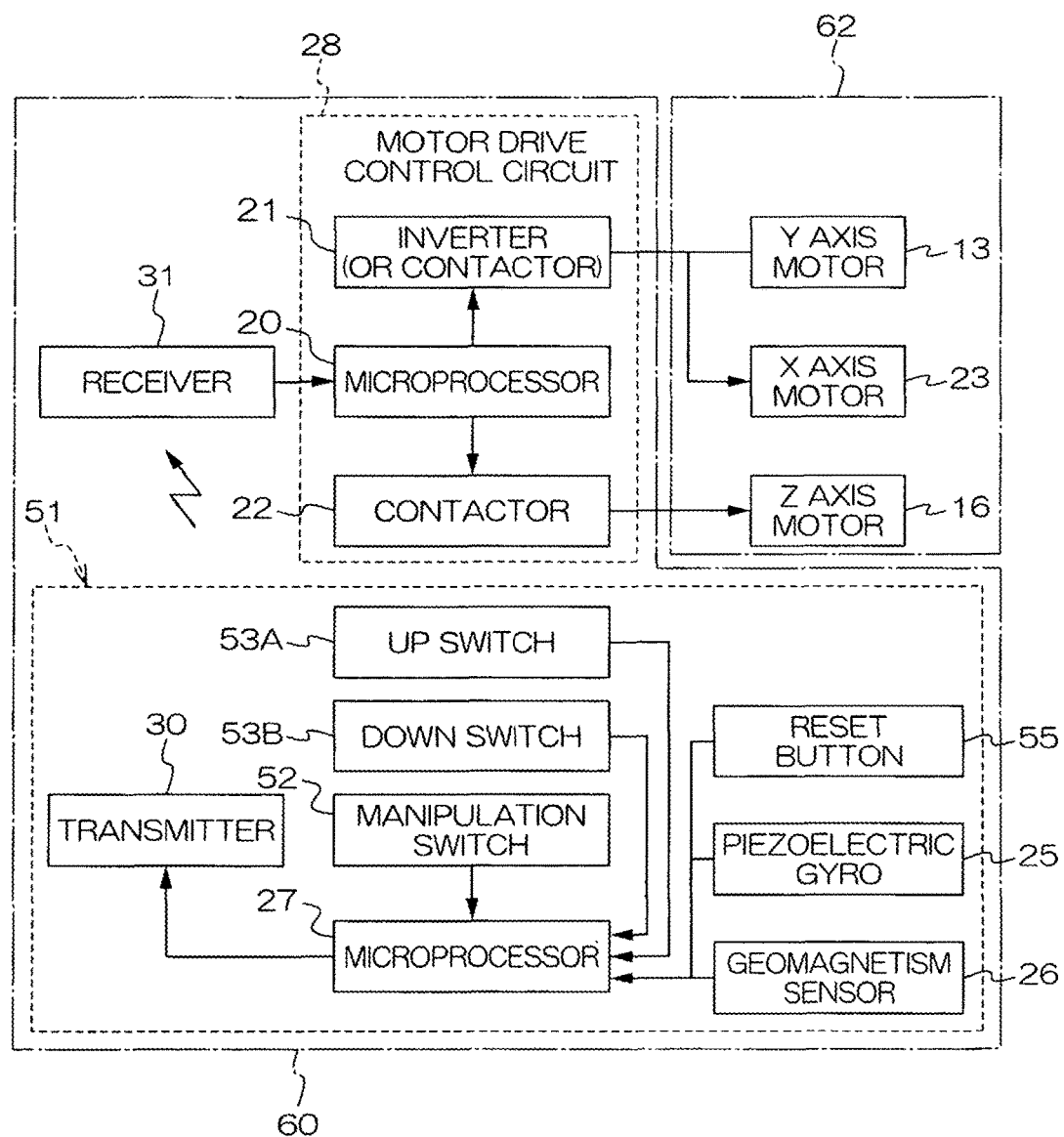

OPERATING DEVICE, AND THREE-DIMENSIONAL MOVEMENT APPARATUS

This application claims the priority benefit under 35 U.S.C. § 120 and is a Continuation of U.S. patent application Ser. No. 14/154,167 filed on Jan. 13, 2014 and issuing as U.S. Pat. No. 9,284,163 on Mar. 15, 2016, which application is a Divisional of abandoned U.S. patent application Ser. No. 12/527,421 filed on Dec. 17, 2009, which application is a U.S. national phase filing under 35 U.S.C. § 371 of International Application No. PCT/JP2008/000226, filed on Feb. 14, 2008, and claims priority under 35 U.S.C. § 119 to Japanese Patent Application No. 2007-034170, filed on Feb. 14, 2007, the entireties of all of which are incorporated by reference herein.

TECHNICAL FIELD

The presently disclosed subject matter relates to a technique for manipulating the movement of a moving body, and more particularly relates to a movement control method, movement manipulation apparatus, movement manipulation method, and so forth, with which the movement of a moving body can be manipulated easily, safely, reliably, and quickly, even by a novice operator.

Definitions and interpretations of the terms used in the presently disclosed subject matter are listed below.

(1) "Remote" is an abbreviation for a remote controller in the sense of an apparatus for remote manipulating, remote controlling, or other such manipulations, or an abbreviation for a remote control in the sense of an apparatus for remote manipulate, remote controlling, or other such manipulations. A difference in signal transmission method (wireless versed wired) does not affect the definition or interpretation of "remote" unless otherwise specified.

(2) Unless otherwise specified, "three-dimensional direction" refers to up, down, right, left, forward, and backward, or to east, west, north, south, up, and down.

(3) "Three-dimensional movement apparatus" refers to an apparatus capable of relatively moving an object in three-dimensional directions. Apparatus that are capable of relative movement (self-propulsion) in three-dimensional directions, or apparatus equipped with constituent members that are capable of relative movement in three-dimensional directions are encompassed by the term "three-dimensional movement apparatus" regardless of whether or not an object that does not constitute the apparatus (such as something being conveyed, like cargo or a cargo bed) is capable of relative movement in three-dimensional directions. Specific examples of a "three-dimensional movement apparatus" include cranes such as overhead cranes, vehicle-mounted cranes, and jib cranes, conveyance robots equipped with a conveyance arm for grasping or carrying objects, hoists (including self-propelled hoists), and radio-controlled airplanes and helicopters.

(4) Specific examples of "lifting devices" include the winders of crane apparatus, the drive motors of conveyance arms used in conveyance robots, the booms used in hoists, and the main rotors of helicopters.

(5) "Moving body" refers to an object that is moved relatively in three-dimensional directions by a three-dimensional movement apparatus. If the apparatus is capable of relative movement (self-propulsion) in three-dimensional directions, the apparatus itself corresponds to the "moving body," and if the apparatus is equipped with a constituent member that is capable of relative movement in three-dimensional directions, that constituent member corresponds to the "moving body." Specific examples of this "moving body" include objects that can be moved relatively in three-dimensional directions by the three-dimensional movement apparatus, the hooks of crane apparatus, the conveyance arms (or the grasping component, carrying component, or other portion thereof corresponding to a cargo bed) for grasping or carrying objects in a conveyance robot, hoist buckets (decks), and helicopter fuselages.

(6) A "movement mechanism" is a mechanism for moving a moving body, and encompasses the prime mover of a lifting device. If the moving body moves in three-dimensional directions, the X-axis motor, Y-axis motor, and Z-axis motor that make this movement possible correspond to the "movement mechanism."

(7) The "direction" in the "direction of the manipulation remote controller casing" may be an absolute direction or a relative direction, unless otherwise specified. For example, it may be the absolute direction in which the manipulation remote controller casing is actually facing, or it may correspond to the "direction of the manipulation remote controller casing, and a direction determined relatively by shifting the orientation of the casing from a direction based on a reference (which may be either a fixed, immutable direction or a direction that itself is variable) also corresponds to this.

(8) The term "manipulation remote controller" may sometimes be abbreviated as "manipulation remote." The term "manipulation remote controller casing" may sometimes be abbreviated as "remote casing." The term "direction of the manipulation remote controller casing" may sometimes be abbreviated as "direction of the remote casing" or "direction of the manipulation remote."

BACKGROUND ART

As shown in Patent Document 1, for example, an overhead crane that is installed in the ceiling of a factory or the like comprises a girder, which has a winder capable of lateral movement, spanning the distance between a pair of saddles that roll over parallel travel rails set up near the ceiling of the building. This winder can be an electric hoist that uses a cable as a winding support, an electric chain block that uses a load chain, or the like. Slinging equipment connected to a load is hung from a hook provided to a hook block suspended from the winder, and the load is moved by the overhead crane to the desired location.

Such overhead cranes are conventionally manipulated by successively pressing the six buttons (east, west, north, south, up, and down) on a wired remote apparatus hanging down from the winder, but when the load is large, there is the possibility that the load hanging from the winder will come into contact with the person manipulating the wired remote apparatus hanging down form the winder, which poses safety problems.

To solve this problem, remote apparatus that are operated wirelessly have been developed, such as the crane-use optical remote apparatus disclosed in Patent Document 2. This crane-use optical remote apparatus is more practical because it makes use of two or more light receptors that have wide-angle light receiving characteristics and are disposed under the winder main body, which deals with the problem that conventional wireless remote apparatus that makes use of radio waves tends to drive up the cost, and while costs can be easily reduced with an optical remote apparatus, if there is something that blocks light, the signals cannot be sent or received.

Patent Document 1: Japanese Patent Application Laid-Open No. 2004-75284

Patent Document 2: Japanese Patent Application Laid-Open No. H1 1-106179

SUMMARY

However, with a wired type of remote apparatus, putting aside wireless types for the moment, when used for an overhead crane or the like that is used in a painting plant or the like, the push buttons on the remote apparatus can become soiled by paint and so forth, making it difficult to read the words (east, west, north, south, up, and down) written on the buttons, and since the operator is typically looking at the remote apparatus while pressing the buttons and manipulating the apparatus, he cannot watch the movement of the load being conveyed by the overhead crane, which not only makes it difficult to perform the work quickly and reliably, but also poses the risk that the operator of the remote apparatus may not notice if the load gets too close.

If the soiling of the remote apparatus is severe, even a veteran operator may have to test the buttons by pressing them first to see which direction the load hanging from the winder moves, after which he can perform the actual conveyance work. Furthermore, if the operator is a novice, he will not instantly be able to tell which way is east, west, north, or south, so a problem is that the work cannot be performed quickly and reliably.

The above problems are not unique to overhead cranes, which are examples of three-dimensional movement apparatuses, and also occur with other three-dimensional movement apparatus. Also, these problems are not unique to three-dimensional movement apparatus, and also occur with other types of movement apparatus that feature a remote apparatus. Nor are they unique to the technological field of painting, and also occur in other technological fields in which there is the risk of soiling the push buttons of the remote apparatus. Nor are they unique to work that is performed indoors in a factory, and are even more apt to be encountered outdoors. Using a remote apparatus to manipulate the movement of a moving body is generally not an easy task for an unskilled novice to carry out safely, reliably, quickly, or efficiently.

According to an aspect of the presently disclosed subject matter, and apparatus can be provided to solve at least one of the above-mentioned problems and to provide a technique with which the operator of a manipulation remote need not look at his hands, and can instead manipulate the movement of a moving body while watching the movement, so that even a novice can perform the task safely, reliably, and quickly or efficiently, and more particularly, a movement control method, a movement manipulation apparatus, a movement manipulation method, and so forth that make such manipulation possible.

The movement control method pertaining to a first mode of the presently disclosed subject matter is a movement control method for manipulating the movement of a moving body, wherein a manipulation remote controller and a movement mechanism for moving a moving body are disposed respectively at one end and the other end of a slender member, and the drive of the movement mechanism is controlled on the basis of a signal related to a direction of a casing of the manipulation remote controller.

The movement control method pertaining to a second mode of the presently disclosed subject matter is the method pertaining to the first mode, wherein the direction of the manipulation remote controller casing is a direction, determined with respect to the slender member or determined using the slender member as a reference.

The movement control method pertaining to a third mode of the presently disclosed subject matter is the method pertaining to the first or second mode, wherein the signal is supplied, through a signal transmission cable that either is the slender member or is disposed within the slender member, from the manipulation remote controller to the drive control apparatus that controls the drive of the movement mechanism.

The movement control method pertaining to a fourth mode of the presently disclosed subject matter is a movement control method for manipulating the movement of a moving body, wherein a manipulation remote controller and a movement mechanism for moving a moving body are disposed respectively at one end and the other end of a slender member that either is a signal transmission cable or is equipped with a signal transmission cable, a signal related to the direction of the casing of the manipulation remote controller is supplied to a drive control apparatus that controls the drive of the movement mechanism, a control signal is produced on the basis of the signal in part of the drive control apparatus, whereby the drive of the movement mechanism is controlled on the basis of the control signal in the rest of the drive control apparatus.

The movement control method pertaining to a fifth mode of the presently disclosed subject matter is the method pertaining to the fourth mode, wherein the control signal is supplied through the signal transmission cable from part of the drive control apparatus to the rest of the drive control apparatus.

The movement control method pertaining to a sixth mode of the presently disclosed subject matter is the method pertaining to any of the first to fifth modes, wherein the signal is a signal related to the direction of the casing, which is rotatably attached to the slender member.

The movement manipulation apparatus pertaining to a seventh mode of the presently disclosed subject matter comprises a slender member that either is a signal transmission cable or is equipped with a signal transmission cable, a casing of a manipulation remote controller disposed at one end of the slender member, casing direction identification means for producing a signal related to the direction of the casing, and a drive control apparatus that is disposed at the other end of the slender member and controls the movement of a moving body on the basis of the signal, wherein the signal is supplied, through the signal transmission cable, from the casing direction identification means to the drive control apparatus.

As a derivative mode of the seventh mode (mode 7A), the apparatus comprises a slender member that either is a signal transmission cable or is equipped with a signal transmission cable, a casing of a manipulation remote controller disposed at one end of the slender member, casing direction identification means for producing a signal related to the direction of the casing, a movement mechanism that is disposed at the other end of the slender member and moves the moving body, and a drive control apparatus that controls the movement of the movement mechanism on the basis of the signal, wherein the signal is supplied through the signal transmission cable to the drive control apparatus.

The movement manipulation apparatus pertaining to an eighth mode of the presently disclosed subject matter is the apparatus pertaining to the seventh mode or mode 7A, wherein the casing is rotatably attached to the slender member, and the casing direction identification means is means for producing a signal related to the direction of the casing, determined with respect to the slender member or determined using the slender member as a reference.

The movement manipulation apparatus pertaining to a ninth mode of the presently disclosed subject matter is the apparatus pertaining to the seventh mode (or mode 7A) or eighth mode, comprising display means for displaying the direction of the casing with respect to the slender member at a location that is easily visible by an operator who holds the casing in a hand and remotely manipulates the movement of the moving body.

The method for the manipulating movement of the moving body pertaining to a tenth mode of the presently disclosed subject matter is a method of which the apparatus is a method using an apparatus pertaining to any of the seventh to ninth modes (including mode 7A), comprising a step of moving a moving body to a desired location by changing the direction of the casing with respect to the slender member or changing the direction using the slender member as a reference.

The method for manipulating movement of a moving body pertaining to the eleventh mode of the presently disclosed subject matter is a method in which the movement manipulation apparatus pertaining to the ninth mode is used, comprising a step of moving the moving body to the desired location by visually confirming the direction of the casing with respect to the slender member displayed on the display means, while relatively changing the direction of the casing with respect to the slender member.

The three-dimensional movement apparatus pertaining to the twelfth mode of the presently disclosed subject matter comprises a movement mechanism equipped with a Z axis motor for moving a moving body in the up and down direction by means of a lifting device, and an X axis motor and a Y axis motor for moving the moving body in the horizontal plane; a motor drive control circuit for driving at least one of the X axis motor, the Y axis motor, and the Z axis motor and for moving the moving body to the desired location; and a manipulation remote that has a casing direction identification means for detecting the direction of the remote casing, a manipulation switch that is built into the remote casing and controls the X axis motor and/or the Y axis motor by means of the above-mentioned motor drive control circuit so that the remote casing is moved horizontally in the direction in which it is facing, and an up and down switch that is built into the remote casing and raises or lowers the moving body, and which communicates with the motor drive control circuit by exchanging data about the direction of the remote casing detected by the casing direction identification means and data about whether or not the manipulation switch or the up and down switch has been operated.

The three-dimensional movement apparatus pertaining to the thirteenth mode of the presently disclosed subject matter is the apparatus pertaining to the twelfth mode, wherein communication between the manipulation remote and the motor drive control circuit is carried out by wired communication using a communication cable that connects the manipulation remote and the motor drive control circuit.

The three-dimensional movement apparatus pertaining to the fourteenth mode of the presently disclosed subject matter is the apparatus pertaining to the thirteenth mode, wherein the communication cable comprises a communication wire enclosed in a bendable, non-twist cable tube, and the casing direction identification means comprises a rotary encoder provided inside a rotary connector that rotatably connects the remote casing to the lower end of the cable tube.

The three-dimensional movement apparatus pertaining to the fifteenth mode of the presently disclosed subject matter is the apparatus pertaining to the fourteenth mode, wherein the rotary encoder is an absolute encoder.

The three-dimensional movement apparatus pertaining to the sixteenth mode of the presently disclosed subject matter is the apparatus pertaining to the twelfth mode, wherein communication between the manipulation remote and the motor drive control circuit is carried out by wireless communication using a receiver connected to the motor drive control circuit and a transmitter provided to the manipulation remote, and the casing direction identification means is a gyro means enclosed in the remote casing.

The three-dimensional movement apparatus pertaining to the seventeenth mode of the presently disclosed subject matter is the apparatus pertaining to the sixteenth mode, wherein the wireless communication is performed by a radio wave communication apparatus.

The three-dimensional movement apparatus pertaining to the eighteenth mode of the presently disclosed subject matter is the apparatus pertaining to the seventeenth mode, wherein the wireless communication is performed by an optical communication apparatus.

The three-dimensional movement apparatus pertaining to the nineteenth mode of the presently disclosed subject matter is the apparatus pertaining to any of the sixteenth to eighteenth modes, wherein the X axis motor and/or the Y axis motor and/or the Z axis motor is actuated and the moving body is moved to a specific home position by turning on the main power supply to the movement mechanism in a state in which the remote casing of the manipulation remote is facing a specific home direction.

The three-dimensional movement apparatus pertaining to the twentieth mode of the presently disclosed subject matter is the apparatus pertaining to any of the twelfth to nineteenth modes, wherein a second manipulation switch is provided to the face of the remote casing on the opposite side from the face where the manipulation switch is provided, and when this second manipulation switch is pressed, the moving body moves in the exact opposite direction from the direction in which the remote casing is oriented.

The three-dimensional movement apparatus pertaining to the twenty-first mode of the presently disclosed subject matter is the apparatus pertaining to any of the twelfth to nineteenth modes, wherein the manipulation switch is a cross key, when the top of the cross key is pressed the moving body moves within the horizontal plane in the direction in which the remote casing is oriented, when the bottom of the cross key is pressed the moving body moves within the horizontal plane in the exact opposite direction to the direction in which the remote casing is oriented, when the left side of the cross key is pressed the moving body moves within the horizontal plane to the left and at 90 degrees to the direction in which the remote casing is oriented, and when the right side of the cross key is pressed the moving body moves within the horizontal plane to the right at 90 degrees to the direction in which the remote casing is oriented.

The three-dimensional movement apparatus pertaining to the twenty-second mode of the presently disclosed subject matter is the apparatus pertaining to any of the twelfth to twenty-first modes, wherein the manipulation switch is a switch that can be pressed in two stages, when it is pressed down firmly, the manipulation switch is fixed in a depressed state, and even if the orientation of the remote casing subsequently changes, the moving body will continue moving in the horizontal plane in the direction in which the remote casing was facing at the point when the manipulation switch was pressed, and when the manipulation switch is pressed firmly again, the manipulation switch returns and the moving body stops.

The three-dimensional movement apparatus pertaining to the twenty-third mode of the presently disclosed subject matter comprises a movement mechanism equipped with a Z axis motor for moving a moving body in the up and down direction by means of a lifting device, and an X axis motor and a Y axis motor for moving the moving body in the horizontal plane; a motor drive control circuit for driving at least one of the X axis motor, the Y axis motor, and the Z axis motor and for moving the moving body to the desired location; and a manipulation remote that is connected by a communication cable to the motor drive control circuit, wherein the communication cable comprises a communication wire enclosed in a bendable, non-twist cable tube, the manipulation remote has a cuboid remote casing fixed to the lower end of the communication cable, manipulation switches provided to the four side faces of the remote casing, and an up and down switch for raising and lowering the moving body, and when one of the manipulation switches is pressed, an electrical signal is transmitted through the communication wire to the motor drive control circuit, the X axis motor and the Y axis motor are driven by the motor drive control circuit, and the moving body moves within the horizontal plane in the direction in which the manipulation switch was pressed.

The three-dimensional movement apparatus pertaining to the twenty-fourth mode of the presently disclosed subject matter is the apparatus pertaining to any of the twelfth to twenty-third modes, comprising display means for displaying the direction in which the remote casing is facing, at a location that is easily visible by an operator who holds the remote casing in a hand and remotely manipulates the movement of the moving body.

The method for manipulating the movement of a moving body pertaining to the twenty-fifth mode of the presently disclosed subject matter is the method for the manipulating movement of the moving body by using the three-dimensional movement apparatus pertaining to any of the twelfth to twenty-third modes, comprising a step of moving the moving body to the desired location by changing the direction in which the remote casing is facing.

The method for manipulating the movement of a moving body pertaining to the twenty-sixth mode of the presently disclosed subject matter is a method for manipulating the movement of a moving body by using the three-dimensional movement apparatus pertaining to the twenty-fourth mode, comprising a step of moving the moving body to the desired location by changing the direction in which the remote casing is facing while visually confirming the direction displayed by the display means.

The method for controlling the movement of a moving body pertaining to the twenty-seventh mode of the presently disclosed subject matter is a movement control method for controlling the drive of a movement apparatus that moves a moving body, wherein a manipulation remote controller disposed at one end of a slender member comprising at least two rod-like members and a connecting member that bendably connects these rod-like members is used to control the drive of the movement apparatus disposed at the other end.

The method for controlling the movement of a moving body pertaining to the twenty-eighth mode of the presently disclosed subject matter is the movement control method pertaining to the twenty-seventh mode, wherein the drive of the movement apparatus is controlled on the basis of a signal amount of rotation or the rotational direction of the casing of the manipulation remote controller attached rotatably around the axis of the rod-like member disposed at one end of the slender member.

The movement manipulation apparatus pertaining to the twenty-ninth mode of the presently disclosed subject matter comprises a slender member comprising at least two rod-like members and a connecting member that bendably connects these rod-like members; a casing of a manipulation remote controller attached rotatably around the axis of the rod-like member disposed at one end of the slender member; signal production means disposed inside the casing, for producing a signal related to the amount of rotation or the rotational direction of the casing around the axis of this rod-like member; a movement apparatus disposed at the other end of the slender member, for moving a moving body; a drive control apparatus for controlling the drive of the drive apparatus on the basis of the signal; and a transmission means for supplying, either through a signal transmission cable or wirelessly, to the drive control apparatus a signal related to the amount of rotation or the rotational direction of the casing.

The movement manipulation apparatus pertaining to the thirtieth mode of the presently disclosed subject matter is the movement manipulation apparatus pertaining to the twenty-ninth mode, wherein the signal production means is a means for producing a signal related to the amount of rotation or the rotational direction of the casing, which is determined relatively with respect to the rod-like members to which the casing is rotatably attached, or determined using the rod-like members as a reference.

The movement manipulation apparatus pertaining to the thirty-first mode of the presently disclosed subject matter is the movement manipulation apparatus pertaining to the twenty-ninth or thirtieth mode, comprising display means for displaying the movement direction of the moving body or a direction selected by an operator who holds the casing in his hand and remotely manipulates the movement of the moving body, at a location that is easily visible by the operator.

The manipulation remote controller pertaining to the thirty-second mode of the presently disclosed subject matter comprises a casing attached rotatably around the axis of the rod-like member disposed at one end of a slender member comprising at least two rod-like members and a connecting member that bendably connects these rod-like members; and signal production means disposed inside the casing, for producing a signal related to the amount of rotation or the rotational direction of the casing around the axis of this rod-like member, wherein this manipulation remote controller controls the drive of a movement apparatus that is disposed at the other end of the slender member and moves a moving body on the basis of the signal.

The method for controlling the movement of a moving body pertaining to the thirty-third mode of the presently disclosed subject matter is a movement control method for controlling the drive of a movement apparatus that moves a moving body, which is a movement control method for using a manipulation remote controller disposed at one end of a slender member to control the drive of the movement apparatus disposed at the other end, wherein the drive of the movement apparatus is controlled on the basis of a signal generated according to the change in the distance between a switching means provided to the casing of the manipulation remote controller, which is disposed at one end of the slender member and is attached rotatably around the axis of a portion of one end of the slender member or the rod-like member constituting that portion, or a member that works in synchronization with this switching means, and a portion of one end of the slender member disposed inside the casing or an object that is integral with this portion, or the rod-like member that constitutes a portion of one end of the slender member or an object that is integral with this rod-like member.

The means for generating the signal in the "signal generated according to the change . . . " is an optical sensor. This "optical sensor" is given as a typical example of a signal generation means, but a "magnetic sensor," "proximity sensor," or other such non-contact sensor can be similarly used.

The method for controlling the movement of a moving body pertaining to the thirty-fourth mode of the presently disclosed subject matter is the movement control method pertaining to the thirty-third mode, which is a movement control method for controlling the drive of a drive apparatus that moves a moving body, which is a movement control method for using a manipulation remote controller disposed at one end of a slender member to control the drive of the movement apparatus disposed at the other end, wherein the drive of the movement apparatus is controlled on the basis of an output signal of an optical sensor, which is outputted according to the change in the distance between a push button provided to the casing of the manipulation remote controller, which is disposed at one end of the slender member and is attached rotatably around the axis of a portion of one end of the slender member or the rod-like member constituting that portion, or a member that works in synchronization with this push button, and a portion of one end of the slender member disposed inside the casing or a disk that is fixed coaxially with this portion, or the rod-like member that constitutes a portion of one end of the slender member or a disk that is that is fixed coaxially with this rod-like member.

The movement manipulation apparatus pertaining to thirty-fifth mode of the presently disclosed subject matter comprises a slender member; a casing of a manipulation remote controller attached rotatably around the axis of a portion of one end of the slender member or the rod-like member that constitutes this portion; a movement apparatus disposed at the other end of the slender member, for moving a moving body; a drive control apparatus for controlling the drive of the movement apparatus; switching means provided to the casing; signal generation means for generating a signal according to the change in the distance between the switching means or a member that works in synchronization with this switching means and a portion of one end of the slender member disposed inside the casing or an object that is integral with this portion, or the rod-like member that constitutes a portion of one end of the slender member or an object that is integral with this rod-like member; and a transmission means for supplying, either through a signal transmission cable or wirelessly, the signal to the drive control apparatus.

The movement manipulation apparatus pertaining to thirty-sixth mode of the presently disclosed subject matter is the movement manipulation apparatus pertaining to the thirty-fifth mode, wherein the switching means is a push button provided to the casing, and the signal generation means comprises an optical sensor for detecting the push button or a member that works in synchronization with the push button, and provided to a portion of one end of the slender member disposed inside the casing or a disk that is fixed coaxially with this portion, or the rod-like member that constitutes a portion of one end of the slender member or a disk that is that is fixed coaxially with this rod-like member.

The manipulation remote controller pertaining to the thirty-seventh mode of the presently disclosed subject matter comprises a casing that is disposed at one end of a slender member and is attached around rotatably around the axis of a portion of one end of the slender member or the rod-like member constituting that portion; switching means provided to the casing; and signal generation means for generating a signal according to the change in the distance between the switching means or a member that works in synchronization with this switching means and a portion of one end of the slender member disposed inside the casing or an object that is integral with this portion, or the rod-like member that constitutes a portion of one end of the slender member or an object that is integral with this rod-like member, wherein this manipulation remote controller controls the drive of a movement apparatus that is disposed at the other end of the slender member and moves a moving body on the basis of the signal.

With the first to eleventh modes of the presently disclosed subject matter, the movement of the moving body can be watched while it is manipulated, without having to watch the manipulation remote in the hands of the operator, so even a novice can manipulate the movement of the moving body easily, safely, reliably, and quickly. An example of the "drive control apparatus" in the first to eleventh modes is an apparatus that controls a drive mechanism for moving a moving body.

The effects of the first to eleventh modes of the presently disclosed subject matter are as follows.

(1) With the movement control method pertaining to the first mode of the presently disclosed subject matter, a manipulation remote controller and a movement mechanism for moving a moving body are disposed respectively at one end and the other end of a slender member, and the drive of the movement mechanism is controlled on the basis of a signal related to the direction of the casing of the manipulation remote controller.

(1-1) The "slender member" here is a member whose length is greater than the cross sectional effective diameter or average diameter, and refers to something in the interior of which a signal transmission cable can be mounted. A condition of the "slender member" is that a signal transmission cable can be mounted in its interior, but the cross section need not be in the form of a closed tube (0-shaped), and may instead be U-shaped or C-shaped, that is, there may be a cut or unsealed portion that exposes the interior to the outside along the lengthwise direction.

The effective surface area of an apparent cross section need not be constant, and the shape may be that of a straight or curved rod. A cable or cable tube thereof that bends but does not twist, or a cable that or cable tube thereof that is bendable but does not twist, corresponds to the "slender member," but ease of bending or twisting is not a condition of the "slender member" unless otherwise specified.

A typical example of a "cable tube that bends but does not twist" or a "cable tube that is bendable but does not twist" is the flexible metal electrical wire tube and vinyl-covered flexible metal electrical wire tube specified in JIS C8309, and more specifically, the Plica Tube or Waterproof Plica Tube (trade names) made by Sankei Manufacturing can be used.

(1-2) The "direction of the manipulation remote controller casing" can be detected using a piezoelectric gyro, an optical fiber gyro, or another such gyro means.

Furthermore, even a signal that does not correspond directly to the "direction of the manipulation remote controller casing" is encompassed in the "signal related to the direction of the manipulation remote controller casing," as long as it can be utilized to find the direction. For instance, the "direction of the manipulation remote controller casing" can be found by vector synthesis of the change in the direction of the remote casing (displacement vector) from a preset reference position. Therefore, a signal corresponding to the change in the direction of the remote casing is encompassed in the "signal related to the direction of the manipulation remote controller casing," as long as it can be used to find the direction.

(1-3) The explanation of the terminology and expressions in (1-1) and (1-2) above apply to the modes of the presently disclosed subject matter.

(1-4) As long as the signal is reliably supplied to the drive control apparatus, the means for detecting the direction of the manipulation remote casing and/or means for producing a signal related to the direction of the casing of the manipulation remote based on this detection result may be installed at one end of the slender member, that is, on the side where the manipulation remote controller is disposed, or may be installed at the other end of the slender member, that is, on the side where the drive control apparatus is disposed. If at least one of these means is installed at one end of the slender member, they can be installed inside the remote casing.

When the means for detecting the direction of the manipulation remote casing is installed at the other end of the slender member, it is logically possible to calculate the direction of the remote casing on the basis of the displacement of the slender member at the other end of the slender member, for example. In this case, however, the length of the slender member, the coefficient of lateral elasticity, the bending stiffness, and other such dynamic characteristics of the material, how well the remote casing is connected, and other such factors can introduce considerable calculation error, so calculation can be difficult at times. Consequently, the means for detecting the direction of the manipulation remote casing can be realized by being basically installed at one end of the slender member, that is, on the side where the manipulation remote controller is disposed.

The above-mentioned gyro means is a means for detecting at least the direction of the manipulation remote casing, and in view of its function, it should be installed at one end of the slender member, that is, on the side where the manipulation remote controller is disposed, and particularly within the remote casing.

(1-5) With the movement control method in the first mode, the movement of a moving body is controlled according to the direction of the casing of the manipulation remote. Therefore, the operator holding the manipulation remote can move the moving body in the desired direction by changing the direction of the remote casing to the direction in which the moving body is to be moved. Here, the operator does not need to pay too much attention to the manipulation of the push buttons on the manipulation remote, and need not take his eye off the moving body. Also, since there are fewer buttons and switches on the remote casing, operating the manipulation remote is easier, and pressing the wrong button or switch will happen less often if the remote casing surface should become soiled.

Thus, with this first mode, there is no need to look at the manipulation remote in the operator's hand, and he can operate it while watching the movement of the moving body, so a movement control method is obtained with which even a novice can manipulate the movement of the moving body easily, safely, reliably, and quickly.

(2) With the movement control method pertaining to the second mode of the presently disclosed subject matter, a signal related to the direction of the remote casing, determined with respect to the slender member or determined using the slender member as a reference, is supplied to the drive control apparatus, and the movement of the moving body is controlled on the basis of this signal. Accordingly, the operator can keep in mind the position of the slender member and move the remote casing using that position as a reference, so the direction of the remote casing can be intuited or perceived more accurately.

Consequently, the operator holding the manipulation remote can change the direction of the remote casing more easily, reliably, and quickly to the direction in which the moving body is to be moved, and can move the moving body in this desired direction more efficiently. Here, the operator does not need to pay too much attention to the manipulation of the push buttons on the manipulation remote, and need not take his eye off the moving body. Also, since there are fewer buttons and switches on the remote casing, operating the manipulation remote is easier, and pressing the wrong button or switch will happen less often if the remote casing surface should become soiled.

Thus, with this second mode, there is no need to look at the manipulation remote in the operator's hand, and he can operate it while watching the movement of the moving body, so a movement control method is obtained with which even a novice can manipulate the movement of the moving body easily, safely, reliably, and quickly.

(3) With the movement control method pertaining to the third mode of the presently disclosed subject matter, a signal related to the direction of the remote casing is supplied from the manipulation remote controller to the drive control apparatus through a signal transmission cable that either is the slender member or is disposed within the slender member.

Consequently, with the third mode, no cable gets in the way and interferes with manipulation by the operator, and the same action and effect are obtained as with the first and second modes.

With the methods pertaining to the first and second modes of the presently disclosed subject matter, there are no restrictions on how the signal related to the direction of the remote casing is supplied from the manipulation remote controller to the drive control apparatus, which may be accomplished by either a wired or wireless configuration. In contrast, with the method pertaining to the third mode, a wired configuration is used, and furthermore the signal transmission cable either doubles as the slender member or is disposed within the slender member. Accordingly, even though a wired configuration is employed there is no need to worry about how the cable is installed.

(4) With the movement control method pertaining to the fourth mode of the presently disclosed subject matter, a manipulation remote controller and a movement mechanism for moving a moving body are disposed respectively at one end and the other end of a slender member that either is a signal transmission cable or is equipped with a signal transmission cable, a signal related to the direction of the manipulation remote controller casing is supplied to a drive control apparatus that controls the drive of the movement mechanism, a control signal is produced on the basis of the signal in part of the drive control apparatus, and the drive of the movement mechanism is controlled on the basis of the control signal in the rest of the drive control apparatus.

Again with the movement control method pertaining to the fourth mode, just as with the method pertaining to the first mode, the movement of the moving body is controlled according to the direction of the manipulation remote casing.

Therefore, the operator holding the manipulation remote can move the moving body in the desired direction by changing the direction of the remote casing to the direction in which the moving body is to be moved. Here, the operator does not need to pay too much attention to the manipulation of the push buttons on the manipulation remote, and need not take his eye off the moving body. Also, since there are fewer buttons and switches on the remote casing, operating the manipulation remote is easier, and pressing the wrong button or switch will happen less often if the remote casing surface should become soiled. Thus, with this fourth mode, there is no need to look at the manipulation remote in the operator's hand, and he can operate it while watching the movement of the moving body, so a movement control method is obtained with which even a novice can manipulate the movement of the moving body easily, safely, reliably, and quickly.

Furthermore, with the method pertaining to the first to third modes of the presently disclosed subject matter, the manipulation remote is disposed at one end of the slender member, and the drive control apparatus at the other end. In contrast, with the method pertaining to this fourth mode, part of the drive control apparatus is also disposed at the one end of the slender member. Accordingly, the adjustment and maintenance work necessary or desired for controlling the movement of a moving body can be accomplished by adjustment and maintenance of the device or apparatus disposed at the one end of the slender member.

With an apparatus to which the method pertaining to the fourth mode is applied, part of the drive control apparatus may be incorporated in the manipulation remote.

(5) With the movement control method pertaining to the fifth mode of the presently disclosed subject matter, a control signal produced by part of the drive control apparatus disposed at one end of the slender member is supplied through the signal transmission cable to the rest of the drive control apparatus.

With the method pertaining to the fourth mode, there are no restrictions on how the control signal produced by part of the drive control apparatus is supplied to the rest of the drive control apparatus, which may be accomplished by either a wired or wireless configuration. In contrast, with the method pertaining to the fifth mode, a wired configuration is used, and furthermore the signal transmission cable either doubles as the slender member or is disposed within the slender member. Accordingly, even though a wired configuration is employed there is no need to worry about how the cable is installed.

(6) With the movement control method pertaining to the sixth mode of the presently disclosed subject matter, the signal related to the direction of the remote casing is a signal related to the direction of the remote casing attached rotatably to the slender member.

(6-1) To install the remote casing rotatably on the slender member, the slender member and the remote casing may be connected via a rotary connector that features a known mechanism that makes this possible. If a rotary encoder is provided inside the rotary connector, and which way and how many times the remote casing turns are measured with this rotary encoder, the signal pertaining to this measurement data will correspond to the "signal related to the direction of the remote casing attached rotatably to the slender member." If this signal is supplied to the drive control apparatus, the movement of the moving body can be controlled on the basis of the control signal outputted from the drive control apparatus.

(6-2) Therefore, the operator holding the manipulation remote can move the moving body in the desired direction by changing the direction of the remote casing to the direction in which the moving body is to be moved. Here, the operator does not need to pay too much attention to the manipulation of the push buttons on the manipulation remote, and need not take his eye off the moving body. Also, since there are fewer buttons and switches on the remote casing, operating the manipulation remote is easier, and pressing the wrong button or switch will happen less often if the remote casing surface should become soiled.

Thus, with this sixth mode, there is no need to look at the manipulation remote in the operator's hand, and he can operate it while watching the movement of the moving body, so a movement control method is obtained with which even a novice can manipulate the movement of the moving body easily, safely, reliably, and quickly.

(6-3) A cable tube that bends but does not twist, or a cable tube that is bendable but does not twist can be used as the slender member. If a cable tube such as this is used, it can be bent so that the manipulation remote can be operated at a location away from directly below the moving body, and since there is no need to be close to the moving body, operator safety is improved. Also, even if the manipulation remote is moved, the cable tube will not rotate, so there is no shifting of the reference point (home point) of the rotary encoder. Consequently, if the rotary encoder is used to measure which way and how many times the remote casing turns, and a signal pertaining to this measurement data is supplied to the drive control apparatus, movement of the moving body can be controlled more precisely.

(6-4) An absolute encoder can also be used as the rotary encoder. The rotational direction and angle of the remote casing are sometimes the only things that can be measured with an ordinary rotary encoder, but the absolute direction in which the remote casing is actually facing can also be measured with an absolute encoder. Therefore, the computation for finding the direction of the remote casing from the output signal of the encoder is simpler.

(7) The movement manipulation apparatus pertaining to the seventh mode of the presently disclosed subject matter comprises a slender member that either is a signal transmission cable or is equipped with a signal transmission cable, a casing of a manipulation remote controller disposed at one end of the slender member, casing direction identification means for producing a signal related to the direction of the casing, and a drive control apparatus that controls the movement of a moving body on the basis of the signal and is disposed at the other end of the slender member, wherein the signal is supplied through the signal transmission cable from the casing direction identification means to the drive control apparatus.

(7-1) Typical examples of the "casing direction identification means" include a piezoelectric gyro, an optical fiber gyro, or another such gyro means, a rotary encoder, and an absolute encoder, but this list is not meant to be comprehensive.

(7-2) With the movement manipulation apparatus pertaining to this seventh mode, the movement of a moving body is controlled according to the direction of the casing of the manipulation remote.

Consequently, the operator holding the manipulation remote can move the moving body in the desired direction by changing the direction of the remote casing to the direction in which the moving body is to be moved. Here, the operator does not need to pay too much attention to the manipulation of the push buttons on the manipulation remote, and need not take his eye off the moving body. Also, since there are fewer buttons and switches on the remote casing, operating the manipulation remote is easier, and pressing the wrong button or switch will happen less often if the remote casing surface should become soiled.

Thus, with this seventh mode, there is no need to look at the manipulation remote in the operator's hand, and he can operate it while watching the movement of the moving body, so a movement manipulation apparatus can be obtained with which even a novice can manipulate the movement of the moving body easily, safely, reliably, and quickly.

(7-3) The movement manipulation apparatus pertaining to mode 7A comprises a slender member that either is a signal transmission cable or is equipped with a signal transmission cable, a casing of a manipulation remote controller disposed at one end of the slender member, casing direction identification means for producing a signal related to the direction of the casing, a movement mechanism that is disposed at the other end of the slender member and moves the moving body, and a drive control apparatus that controls the movement of the movement mechanism of a moving body on the basis of the signal, wherein the signal is supplied through the signal transmission cable to the drive control apparatus.
This mode has the same action and effect as those of the seventh mode.

(8) With the movement manipulation apparatus pertaining to the eighth mode, the manipulation remote casing is rotatably attached to the slender member, and the casing direction identification means is a means for producing a signal related to the direction of the casing, determined with respect to the slender member or determined using the slender member as a reference.

(8-1) First, with the apparatus pertaining to this eighth mode, the remote casing is rotatably attached to the slender member. To install the remote casing rotatably on the slender member, the slender member and the remote casing may be connected via a rotary connector that features a known mechanism that makes this possible. If the rotary encoder serving as the casing direction identification means is provided inside the rotary connector, and which way and how many times the remote casing turns are measured with this rotary encoder, and the signal pertaining to this measurement data is supplied to the drive control apparatus, then movement of the moving body will be controlled on the basis of the control signal outputted from the drive control apparatus.

Consequently, if the apparatus pertaining to this eighth mode is used, the operator holding the manipulation remote can move the moving body in the desired direction by changing the direction of the remote casing to the direction in which the moving body is to be moved.

A cable tube that bends but does not twist, or a cable tube that is bendable but does not twist can be used as the slender member (see (6-3) above), and an absolute encoder can be used as the rotary encoder (see (6-4) above), and in this respect this mode is the same as the fifth mode, and will therefore not be described again.

(8-2) With the apparatus pertaining to this eighth mode, the casing direction identification means produces a signal related to the direction of the casing, determined with respect to the slender member or determined using the slender member as a reference, and this signal is supplied to the drive control apparatus. Accordingly, the operator can keep in mind the position of the slender member and move the remote casing using that position as a reference, so the direction of the remote casing can be intuited or perceived more accurately.

Consequently, the operator holding the manipulation remote can change the direction of the remote casing more easily, reliably, and quickly to the direction in which the moving body is to be moved, and can move the moving body in this desired direction more efficiently.

(8-3) Also, the operator does not need to pay too much attention to the manipulation of the push buttons on the manipulation remote, and need not take his eye off the moving body. Also, since there are fewer buttons and switches on the remote casing, operating the manipulation remote is easier, and pressing the wrong button or switch will happen less often if the remote casing surface should become soiled.

Thus, with this eighth mode, there is no need to look at the manipulation remote in the operator's hand, and he can operate it while watching the movement of the moving body, so a movement control apparatus is obtained with which even a novice can manipulate the movement of the moving body easily, safely, reliably, and quickly.

(9) The movement manipulation apparatus pertaining to the ninth mode of the presently disclosed subject matter comprises display means for displaying the direction in which the remote casing is facing at a location that is easily visible by an operator who holds the remote casing in his hand and remotely manipulates the movement of the moving body.

(9-1) The phrase "at a location that is easily visible by an operator" here means a location that is within the field of vision of the operator when he operates the manipulation remote. Typical examples of this would be a suitable location on the remote casing or the nearby slender member that is within the field of vision when the operator glances at his hands, a suitable location on the moving body that is within the field of vision when the operator looks at the moving body, or on the ceiling, a wall, or another location, but in these examples a prerequisite is that the location be one that does not adversely affect manipulation of the manipulation remote and does not hamper movement of the moving body. Typical examples of the display means for displaying the direction in which the remote casing is facing include electro-optic notice boards or direction indicators that display the direction in letters, symbols, numerals, arrows, different colors or shades, flashing lights, or the like, but there are no particular restrictions as long as the display allows the operator to perceive or intuit the direction in question.

(9-2) Consequently, the operator can operate the manipulation remote while checking the display means to ascertain the orientation of the casing of the manipulation remote, so the orientation of the casing does not have to be checked by constantly monitoring the manipulation remote in his hand. Also, since the operator can monitor the movement of the moving body while confirming the orientation of the remote casing in his hand from the display on the display means, without greatly shifting his field of vision, manipulation is easier and the work is more efficient. The work can also be carried out more safely.

Thus, with this ninth mode, there is no need to look at the manipulation remote in the operator's hand, and he can operate it while watching the movement of the moving body, so a movement manipulation apparatus is obtained with which even a novice can manipulate the movement of the moving body easily, safely, reliably, and quickly.

(10) The method for manipulating the movement of a moving body pertaining to the tenth mode of the presently disclosed subject matter comprises a step in which a moving body is moved to the desired location by changing the direction of the casing of a manipulation remote with respect to a slender member or changing the direction using a slender member as a reference.

Accordingly, the operator can keep in mind the position of the slender member and move the remote casing using that position as a reference, so the direction of the remote casing can be intuited or perceived more accurately. Consequently, the operator holding the manipulation remote can change the direction of the remote casing more easily, reliably, and quickly to the direction in which the moving body is to be moved, and can move the moving body in this desired direction more efficiently. Here, the operator does not need to pay too much attention to the manipulation of the push buttons on the manipulation remote, and need not take his eye off the moving body. Also, since there are fewer buttons and switches on the remote casing, operating the manipulation remote is easier, and pressing the wrong button or switch will happen less often if the remote casing surface should become soiled.

Thus, with this tenth mode, there is no need to look at the manipulation remote in the operator's hand, and he can operate it while watching the movement of the moving body, so even a novice can manipulate the movement of the moving body easily, safely, reliably, and quickly.

(11) The method for manipulating the movement of a moving body pertaining to the eleventh mode of the presently disclosed subject matter comprises a step of moving the moving body to the desired location by visually confirming the direction of the casing with respect to the slender member displayed on the display means, while relatively changing the direction of the casing relative to the slender member.

Consequently, the operator can manipulate the manipulation remote while confirming the orientation of the manipulation remote controller from the display on the display means, so the orientation of the casing does not have to be checked by constantly monitoring the manipulation remote in his hand. Also, since the operator can monitor the movement of the moving body while confirming the orientation of the remote casing in his hand from the display on the display means, without greatly shifting his field of vision, manipulation is easier and the work is more efficient. The work can also be carried out more safely.

Thus, with this eleventh mode, there is no need to look at the manipulation remote in the operator's hand, and he can operate it while watching the movement of the moving body, so even a novice can manipulate the movement of the moving body easily, safely, reliably, and quickly.

With the twelfth to twenty-sixth modes of the presently disclosed subject matter, there is no need to look at the manipulation remote in the operator's hand, and he can operate it while watching the movement of the moving body, so even a novice can manipulate the movement of a moving body in three-dimensional directions easily, safely, reliably, and quickly.

The action and effect of the twelfth to twenty-sixth modes of the presently disclosed subject matter are as follows. The "motor drive control circuit" in the twelfth to twenty-sixth modes is encompassed in the "drive control apparatus" of the first to eleventh modes.

(12) The three-dimensional movement apparatus pertaining to the twelfth mode of the presently disclosed subject matter comprises a movement mechanism equipped with a Z axis motor for moving a moving body in the up and down direction by means of a lifting device, and an X axis motor and a Y axis motor for moving the moving body in the horizontal plane; a motor drive control circuit for driving at least one of the X axis motor, the Y axis motor, and the Z axis motor and for moving the moving body to the desired location; and a manipulation remote that has a casing direction identification means for detecting the direction of the remote casing, a manipulation switch that is built into the remote casing and controls the X axis motor and/or the Y axis motor by means of the above-mentioned motor drive control circuit so that the remote casing is moved horizontally in the direction in which it is facing, and an up and down switch that is built into the remote casing and raises or lowers the moving body, and which communicates with the motor drive control circuit by exchanging data about the direction of the remote casing detected by the casing direction identification means and data about whether or not the manipulation switch or the up and down switch has been operated.

Consequently, the operator can move the moving body horizontally to the desired location, without taking his eye off the moving body, by holding the manipulation remote in his hand and monitoring the moving body while holding down the manipulation switches and facing the remote casing in the direction in which the moving body is to be moved within the horizontal plane. The moving body can be lowered to the desired location by operating the up and down switch on the remote casing.

Therefore, with this twelfth mode, even a novice can manipulate quickly, safely, and reliably, and since there are only two (when the up and down switches are integrated) or three (when the up switch and the down switch are separate in the up and down switch) switches on the remote casing, there is no risk of pressing the wrong switch even if the remote casing surface should become soiled. Thus, there is no need to look at the manipulation remote in the operator's hand, and he can operate it while watching the movement of the moving body, so a three-dimensional movement apparatus is obtained with which even a novice can manipulate easily, safely, reliably, and quickly.

(13) With the three-dimensional movement apparatus pertaining to the thirteenth mode of the presently disclosed subject matter, communication between the manipulation remote and the motor drive control circuit is accomplished by wired communication using a communication cable that connects the manipulation remote and the motor drive control circuit. Using this wired manipulation configuration affords a simple constitution, with no need to attach a wireless communication apparatus as with the above-mentioned Patent Document 2. Also, the moving body can be moved horizontally in the desired direction by using a piezoelectric gyro, an optical fiber gyro, or another such gyro means as the casing direction identification means, even if the communication cable should twist, the direction of the remote casing can be detected exactly.

Consequently, the operator can move the moving body horizontally to the desired location, without taking his eye off the moving body, by holding the manipulation remote in his hand and monitoring the moving body while holding down the manipulation switches and facing the remote casing in the direction in which the moving body is to be moved within the horizontal plane. The moving body can be lowered to the desired location by operating the up and down switch on the remote casing.

Therefore, with this thirteenth mode, even a novice can manipulate quickly, safely, and reliably, and since there are only two (when the up and down switches are integrated) or three (when the up switch and the down switch are separate in the up and down switch) switches on the remote casing, there is no risk of pressing the wrong switch even if the remote casing surface should become soiled. Thus, there is no need to look at the manipulation remote in the operator's hand, and he can operate it while watching the movement of the moving body, so a three-dimensional movement apparatus is obtained with which even a novice can manipulate easily, safely, reliably, and quickly.

(14) With the three-dimensional movement apparatus pertaining to the fourteenth mode of the presently disclosed subject matter, the communication cable comprises a communication wire enclosed in a bendable, non-twist cable tube, and the casing direction identification means comprises a rotary encoder provided inside a rotary connector that rotatably connects the remote casing to the lower end of the cable tube.

A specific example of the "cable tube that bends but does not twist" or "cable tube that is bendable but does not twist" is the flexible metal electrical wire tube and vinyl-covered flexible metal electrical wire tube specified in JIS C8309. For example, the Plica Tube or Waterproof Plica Tube (trade names) made by Sankei Manufacturing can be used. The "cable tube that bends but does not twist" is not limited to these specific examples, and any one can be used as long as it is bendable but does not twist, This allows the cable tube to be bent so that the manipulation remote can be operated at a location away from directly below the moving body, and since there is no need to be close to the moving body, operator safety is improved. Also, since the cable tube bends but does not twist, even if the manipulation remote is moved, the cable tube will not rotate, so there is no shifting of the reference point (home point) of the rotary encoder serving as the casing direction identification means. Therefore, if the rotary encoder provided in the rotary connector is used to measure which way and how many times the remote casing turns, this measurement data can be sent through a communication wire to the motor drive control circuit, and the motor drive control circuit can control the X axis motor and/or the Y axis motor, on the basis of the received measurement data, so that the moving body is moved in the horizontal plane in the direction in which the remote casing is facing.

Consequently, the operator can move the moving body horizontally to the desired location, without taking his eye off the moving body, by holding the manipulation remote in his hand and monitoring the moving body while holding down the manipulation switches and facing the remote casing in the direction in which the moving body is to be moved within the horizontal plane. The moving body can be lowered to the desired location by operating the up and down switch on the remote casing.

Therefore, even a novice can manipulate quickly, safely, and reliably, and since there are only two (when the up and down switches are integrated) or three (when the up switch and the down switch are separate in the up and down switch) switches on the remote casing, there is no risk of pressing the wrong switch even if the remote casing surface should become soiled.

Thus, with this fourteenth mode, there is no need to look at the manipulation remote in the operator's hand, and he can operate it while watching the movement of the moving body, so a three-dimensional movement apparatus is obtained with which even a novice can manipulate easily, safely, reliably, and quickly.

(15) With the three-dimensional movement apparatus pertaining to the fifteenth mode of the presently disclosed subject matter, an absolute encoder is used as the rotary encoder.

The "absolute encoder" here is an encoder that not only measures the rotational direction and angle as with an ordinary rotary encoder, but can also detect the absolute direction in which the remote casing is actually facing.

The result is that when the main power supply to the three-dimensional movement apparatus is shut off when the work is finished, interrupted, etc., and the main power supply to the three-dimensional movement apparatus is then turned back on, the absolute encoder can instantly detect the direction in which the remote casing is facing, so there is no need for resetting every time the main power supply is turned off and on, and manipulation can start right away.

Consequently, the operator can move the moving body horizontally to the desired location, without taking his eye off the moving body, by holding the manipulation remote in his hand and monitoring the moving body while holding down the manipulation switches and facing the remote casing in the direction in which the moving body is to be moved within the horizontal plane. The moving body can be lowered to the desired location by operating the up and down switch on the remote casing.

Therefore, even a novice can manipulate quickly, safely, and reliably, and since there are only two (when the up and down switches are integrated) or three (when the up switch and the down switch are separate in the up and down switch) switches on the remote casing, there is no risk of pressing the wrong switch even if the remote casing surface should become soiled.

Thus, with this fifteenth mode, there is no need to look at the manipulation remote in the operator's hand, and he can operate it while watching the movement of the moving body, so a three-dimensional movement apparatus is obtained with which even a novice can manipulate easily, safely, reliably, and quickly, and there is no need for resetting every time the main power supply is turned off and on, so manipulation can start right away.

(16) With the three-dimensional movement apparatus pertaining to the sixteenth mode of the presently disclosed subject matter, communication between the manipulation remote and the motor drive control circuit is carried out by wireless communication using a receiver connected to the motor drive control circuit and a transmitter provided to the manipulation remote, and the casing direction identification means is a gyro means enclosed in the remote casing.

A piezoelectric gyro, an optical fiber gyro, or the like can be used as the gyro means. The remote casing can be in any shape, such as a flat shape, a disk shape, a cuboid shape, or a three-dimensional shape, and the front or a distal end of the remote casing may be printed or otherwise labeled so that the direction of the remote casing will be obvious. Also, manipulation switches may be provided at any position on the remote casing.

A major distinction of the three-dimensional movement apparatus pertaining to the sixteenth mode is that it involves wireless remote manipulation, as opposed to the wired manipulation of the three-dimensional movement apparatus pertaining to the thirteenth to fifteenth modes. Specifically, the gyro means provided to the manipulation remote detects the absolute bearing in which the remote casing is facing, this data is transmitted by wireless signal from the transmitter to the receiver, the motor drive control circuit receives this signal, and the X axis motor and Y axis motor are controlled so as to move the moving body horizontally in the direction of the remote casing.

Therefore, there is no need to worry about how the cable is installed, as with wired remote manipulation, and the moving body can be manipulated from a place far away from directly below it (the place of a crane apparatus, helicopter, etc.), so operator safety is improved and manipulation is easier.

If the orientation of the remote casing should go beyond the detection limit of the gyro means, the moving body can no longer be moved properly by the manipulation remote, which can be dangerous. To prevent this from happening, the configuration can be such that if the orientation of the remote casing should go beyond the detection limit of the gyro means, the moving body will not move even if the manipulation switch on the manipulation remote is pressed.

Thus, with this sixteenth mode, there is no need to look at the manipulation remote in the operator's hand, and he can operate it while watching the movement of the moving body, so a three-dimensional movement apparatus is obtained with which even a novice can manipulate the movement of the moving body easily, safely, reliably, and quickly, and with which safety is improved and manipulation is easier.

(17) With the three-dimensional movement apparatus pertaining to the seventeenth mode of the presently disclosed subject matter, wireless communication is achieved with a radio wave communication apparatus. The term "radio wave" here means an electromagnetic wave with a frequency of about a few THz or less, and includes long waves, medium waves, short waves, ultra-short waves, and microwaves.

With this seventeenth mode, reliable communication by wireless communication with radio waves will be possible even if an obstacle should be in between the transmitter and receiver, so the operator holding the manipulation remote can move and manipulate the moving body from a location that is safe and affords the easiest manipulation. Thus, by using radio waves as the wireless communication means, a three-dimensional movement apparatus is obtained that is extremely easy to use regardless of where the manipulation remote is operated, and in turn there is no need to look at the manipulation remote in the operator's hand, and he can operate it while watching the movement of the moving body, so even a novice can manipulate the movement of the moving body easily, safely, reliably, and quickly, and the apparatus is extremely easy to use regardless of where the manipulation remote is operated.

(18) With the three-dimensional movement apparatus pertaining to the eighteenth mode of the presently disclosed subject matter, wireless communication is achieved with an optical communication apparatus. The term "optical" here refers to electromagnetic waves with a wavelength between about 1 nm and about 1 mm, and is not limited to visible light rays, but includes infrared rays and ultraviolet rays.

Light, unlike radio waves, has the disadvantage that the transmission of a signal will be blocked if there is an obstacle between the transmitter (light emitting apparatus) and the receiver (light receiving apparatus), but an advantage is that an optical communication apparatus is far less expensive than a radio wave communication apparatus. Therefore, the operating system of a three-dimensional movement apparatus featuring wireless communication can be constructed inexpensively.

Thus, with this eighteenth mode, there is no need to look at the manipulation remote in the operator's hand, and he can operate it while watching the movement of the moving body, so a three-dimensional movement apparatus is obtained with which even a novice can manipulate the movement of the moving body easily, safely, reliably, and quickly, and with which an operating system featuring wireless communication can be constructed inexpensively.

(19) With three-dimensional movement apparatus pertaining to the nineteenth mode of the presently disclosed subject matter, the X axis motor and/or the Y axis motor and/or the Z axis motor is actuated and the moving body is moved to a specific home position by turning on the main power supply to the movement mechanism in a state in which the remote casing of the manipulation remote is facing a specific home direction.

With a three-dimensional movement apparatus having wireless manipulation, when the main power supply to the three-dimensional movement apparatus is turned off and on, an absolute encoder cannot be used as with the three-dimensional movement apparatus pertaining to the fifteenth mode, so some means for resetting is or may be necessary. This is particularly true in the case of a vehicle-mounted crane or the like.

In view of this, when the main power supply to the three-dimensional movement apparatus is turned off, the remote casing of the manipulation remote is left oriented in a specific home direction, a main power switch provided to the manipulation remote or a main power switch provided to some other place is turned on, and at least one of the X axis motor, the Y axis motor, and the Z axis motor is driven to move the moving body to a specific home position, thereby performing a resetting manipulation. Data indicating the direction in which the remote casing of the manipulation remote is facing at this point is measured by a gyro means built into the remote casing, and sent out wirelessly.

Particularly with a three-dimensional movement apparatus featuring wireless manipulation, the fact that the manipulation remote can have its own power supply can actually be utilized, and if the power supply for the manipulation remote is a rechargeable battery, and the design is such that the remote casing will face a specific home direction when the manipulation remote is placed in a charger, then the resetting manipulation can be performed more reliably.

Thus, with this nineteenth mode, the three-dimensional movement apparatus can be obtained with no need to look at the manipulation remote in the operator's hand, and he can operate it while watching the movement of the moving body, so even a novice can manipulate easily, safely, reliably, and quickly, and resetting can be reliably accomplished every time the main power supply is turned off and on.

(20) With the three-dimensional movement apparatus pertaining to the twentieth mode of the presently disclosed subject matter, a second manipulation switch is provided to the face of the remote casing on the opposite side from the face where the manipulation switch is provided, and when this second manipulation switch is pressed, the moving body moves in the exact opposite direction from the direction in which the remote casing is oriented.

With the three-dimensional movement apparatus pertaining to the twelfth to nineteenth modes, the remote casing had to be rotated 360 degrees to move the moving body 360 degrees in any direction within the horizontal plane, but with the three-dimensional movement apparatus pertaining to the twentieth mode, the moving body can be moved 360 degrees in any direction within the horizontal plane by rotating the remote casing within a range of just 180 degrees.

Consequently, it is easier for the operator to operate the three-dimensional movement apparatus, and it can be operated with the operator in a comfortable posture and for a short movement distance. Also, the moving body can be moved with the operator always facing it, and since the operator does not have to turn his back on the moving body while it is moving, safety is improved.

Thus, with this twentieth mode, there is no need to look at the manipulation remote in the operator's hand, and he can operate it while watching the movement of the moving body, so a three-dimensional movement apparatus is obtained with which even a novice can manipulate easily, safely, reliably, and quickly, the operating posture is more comfortable, shorter distances are possible, and safer manipulation is afforded.

(21) With the three-dimensional movement apparatus pertaining to the twenty-first mode of the presently disclosed subject matter, the manipulation switch is a cross key, when the top of the cross key is pressed the moving body moves within the horizontal plane in the direction in which the remote casing is oriented, when the bottom of the cross key is pressed the moving body moves within the horizontal plane in the exact opposite direction to the direction in which the remote casing is oriented, when the left side of the cross key is pressed the moving body moves within the horizontal plane to the left and at 90 degrees to the direction in which the remote casing is oriented, and when the right side of the cross key is pressed the moving body moves within the horizontal plane to the right at 90 degrees to the direction in which the remote casing is oriented.

With the three-dimensional movement apparatus pertaining to the twelfth to nineteenth modes, the remote casing had to be rotated 360 degrees to move the moving body 360 degrees in any direction within the horizontal plane, and with the three-dimensional movement apparatus pertaining to the twentieth mode, the remote casing had to be rotated 180 degrees, but with the three-dimensional movement apparatus pertaining to the twenty-first mode, the moving body can be moved 360 degrees in any direction within the horizontal plane by rotating the remote casing within a range of just 90 degrees.

Consequently, it is even easier for the operator to operate the three-dimensional movement apparatus, and it can be operated with the operator in a more comfortable posture and for a shorter movement distance. Also, the moving body can be moved with the operator always facing it, and since the operator does not have to turn his back on the moving body while it is moving, safety is improved.

Thus, with this twenty-first mode, there is no need to look at the manipulation remote in the operator's hand, and he can operate it while watching the movement of the moving body, so a three-dimensional movement apparatus is obtained with which even a novice can manipulate easily, safely, reliably, and quickly, the operating posture is more comfortable, shorter distances are possible, and safer manipulation is afforded.

(22) With three-dimensional movement apparatus pertaining to the twenty-second mode of the presently disclosed subject matter, the manipulation switch is a switch that can be pressed in two stages, when it is pressed down firmly, the manipulation switch is fixed in a depressed state, and even if the orientation of the remote casing subsequently changes, the moving body will continue moving in the horizontal plane in the direction in which the remote casing was facing at the point when the manipulation switch was pressed, and when the manipulation switch is pressed firmly again, the manipulation switch returns and the moving body stops.

There will be more burden on the operator if the design is such that the operator has to hold the remote casing with it facing in the direction in which the moving body is to be moved within the horizontal plane even after the direction of the remote casing is aligned with the movement direction and the manipulation switch is pressed. In view of this, if the manipulation switch is one that can be pressed in two stages, so that it is fixed in its pressed state when pressed firmly, and the direction of horizontal movement of the moving body will not change even if the orientation of the remote casing is subsequently changed, then there will be no need to hold the remote casing in a constant orientation, and this greatly alleviates the burden on the operator. The design may be such that when the moving body is to be stopped, the manipulation switch is returned by pressing it firmly again.

Thus, with this twenty-second mode, there is no need to look at the manipulation remote in the operator's hand, and he can operate it while watching the movement of the moving body, so a three-dimensional movement apparatus is obtained with which even a novice can manipulate easily, safely, reliably, and quickly, and the burden on the operator is greatly alleviated.

(23) The three-dimensional movement apparatus pertaining to the twenty-third mode of the presently disclosed subject matter comprises a movement mechanism equipped with a Z axis motor for moving a moving body in the up and down direction by means of a lifting device, and an X axis motor and a Y axis motor for moving the moving body in the horizontal plane; a motor drive control circuit for driving at least one of the X axis motor, the Y axis motor, and the Z axis motor and for moving the moving body to the desired location; and a manipulation remote that is connected by a communication cable to the motor drive control circuit, wherein the communication cable comprises a communication wire enclosed in a bendable, non-twist cable tube, the manipulation remote has a cuboid remote casing fixed to the lower end of the communication cable, manipulation switches provided to the four side faces of the remote casing, and an up and down switch for raising and lowering the moving body, and when one of the manipulation switches is pressed, an electrical signal is transmitted through the communication wire to the motor drive control circuit, the X axis motor and the Y axis motor are driven by the motor drive control circuit, and the moving body moves within the horizontal plane in the direction in which the manipulation switch was pressed.

As a result, the moving body is monitored while the manipulation switch for the direction in which the moving body is to be moved is pressed from among the four manipulation switches provided to the side faces of the remote casing, and when the direction in which the moving body is to be moved is oblique with respect to the cuboid remote casing, the moving body is moved in a zigzag pattern within the horizontal plane by alternately pressing two manipulation switches, allowing the operator to move the moving body to the desired location without taking his eye off the moving body. The moving body can be lowered to the desired location by operating the up and down switch on the remote casing and lowering the moving body.

Consequently, the three-dimensional movement apparatus can be operated quickly, safely, and reliably even by a novice, and since only one manipulation switch is provided to each side face of the remote casing, there is no risk of pressing the wrong switch even if the remote casing surface should become soiled.

Also, with the three-dimensional movement apparatus pertaining to the twenty-third mode, unlike with the three-dimensional movement apparatus pertaining to the twelfth to twenty-second modes, the constitution is simple and does not make use of any expensive device such as the casing direction identification means (rotary encoder, gyro apparatus, etc.), so the cost is lower.

Furthermore, with the three-dimensional movement apparatus pertaining to the twenty-third mode, the side faces of the remote casing do not need to be parallel to the X and Y axes of the three-dimensional movement apparatus. However, if the side faces of the remote casing are made parallel to the X and Y axes of the three-dimensional movement apparatus, then when the moving body is moved horizontally in the X axial direction, the operator need only hold down one manipulation switch, and when the moving body is moved horizontally in the Y axial direction, only one manipulation switch needs to be held down, so manipulation is easier for the operator.

Thus, with the twenty-third mode, there is no need to look at the manipulation remote in the operator's hand, and he can operate it while watching the movement of the moving body, so a three-dimensional movement apparatus is obtained with which even a novice can manipulate easily, safely, reliably, and quickly, and the cost can be reduced.

(24) Three-dimensional movement apparatus pertaining to the twenty-fourth mode of the presently disclosed subject matter comprises display means for displaying the direction in which the remote casing is facing, at a location that is easily visible by an operator who holds the casing in his hand and remotely manipulates the movement of the moving body. The meaning and interpretation of "a location that is easily visible by an operator" are the same as given above (see (9-1) above).

Consequently, an operator can operate the manipulation remote while checking the orientation of the casing of the manipulation remote from the display on the display means, so the orientation of the casing does not have to be checked by constantly monitoring the manipulation remote in his hand. Also, since the operator can monitor the movement of the moving body while confirming the orientation of the remote casing in his hand from the display on the display means, without greatly shifting his field of vision, manipulation is easier and the work is more efficient. The work can also be carried out more safely.

Thus, with this twenty-fourth mode, there is no need to look at the manipulation remote in the operator's hand, and he can operate it while watching the movement of the moving body, so a three-dimensional movement apparatus is obtained with which even a novice can manipulate in the three-dimensional direction the movement of the moving body easily, safely, reliably, quickly, and efficiently.

(25) The method for manipulating the movement of a moving body pertaining to the twenty-fifth mode of the presently disclosed subject matter comprises a step of moving the moving body to the desired location by changing the direction in which the remote casing is facing. Consequently, with this twenty-fifth mode, there is no need to look at the manipulation remote in the operator's hand, and he can operate it while watching the movement of the moving body, so even a novice can manipulate the movement of the moving body in three-dimensional directions easily, safely, reliably, and quickly.

(26) The method for manipulating the movement of a moving body pertaining to the twenty-sixth mode of the presently disclosed subject matter comprises a step of moving the moving body to the desired location by changing the direction in which the remote casing is facing while visually confirming the direction displayed by the display means.

Consequently, the operator can operate the manipulation remote while checking the display means to ascertain the orientation of the casing of the manipulation remote, so the orientation of the casing does not have to be checked by constantly monitoring the manipulation remote in his hand. Also, since the operator can monitor the movement of the moving body while confirming the orientation of the remote casing in his hand from the display on the display means, without greatly shifting his field of vision, manipulation is easier and the work is more efficient. The work can also be carried out more safely.

Thus, with this twenty-sixth mode, there is no need to look at the manipulation remote in the operator's hand, and he can operate it while watching the movement of the moving body, so even a novice can manipulate the movement of the moving body in three-dimensional directions easily, safely, reliably, quickly, and efficiently.

DESCRIPTION OF EMBODIMENT

Embodiments of the presently disclosed subject matter will now be described through reference to the drawings.

Embodiment 1

First, the three-dimensional movement apparatus pertaining to Embodiment 1 of the presently disclosed subject matter will be described through reference to FIGS. 1 to 4.

FIG. 1 is an oblique view of the overall configuration of an overhead crane, which is an example of the three-dimensional movement apparatus pertaining to Embodiment 1 of the presently disclosed subject matter. FIG. 2 is a diagram of the structure of a lifting device of an overhead crane, which is an example of the three-dimensional movement apparatus pertaining to Embodiment 1 of the presently disclosed subject matter. FIG. 3A is an oblique view of the remote casing portion of a manipulation remote in a three-dimensional movement apparatus pertaining to Embodiment 1 of the presently disclosed subject matter, and FIG. 3B is an oblique view of the remote casing portion of a manipulation remote in a three-dimensional movement apparatus pertaining to a modification of Embodiment 1 of the presently disclosed subject matter. FIG. 4 is a block diagram illustrating the control mechanism in an overhead crane, which is an example of the three-dimensional movement apparatus pertaining to Embodiment 1 of the presently disclosed subject matter.

As shown in FIG. 1, an overhead crane 1 serving as an example of the three-dimensional movement apparatus in Embodiment 1 of the presently disclosed subject matter comprises a crane girder 4 which is equipped with a winder 5 (serving as a lifting device) capable of lateral movement, and which spans the distance between a pair of saddles 3A and 3B that travel on wheels over travel rails 2A and 2B set up in parallel near the ceiling of a building. A hook 7 (serving as a moving body) is fixed to the distal end of a support cable 6 that is wound up by the winder 5 (lifting device).

Because the overhead crane 1 is thus configured such that the crane girder 4 is installed substantially perpendicular to the travel rails 2A and 2B, and the winder 5 with the hook 7 at its distal end moves over this crane girder 4, it is applicable as the three-dimensional movement apparatus pertaining to the presently disclosed subject matter, which focuses on a movement mechanism equipped with a Z axis motor for moving the hook 7 (moving body) in the up and down direction, and an X axis motor and Y axis motor for moving within the horizontal plane.

A communication cable 8 (serving as the slender member) that will bend but does not twist (hangs down from the winder 5 to near the floor, and the lower end of the communication cable 8 is connected to a remote casing 10 via a rotary connector 12 that is able to rotate with respect to the communication cable 8. The communication cable 8 here that will bend but does not twist comprises a communication wire enclosed in a bendable, non-twist cable tube, and the casing direction identification means comprises a rotary encoder provided inside the rotary connector 12 that rotatably connects the remote casing 10 to the lower end of the cable tube. A specific example of the "bendable, non-twist cable tube" is the flexible metal electrical wire tube and vinyl-covered flexible metal electrical wire tube specified in JIS C8309. For example, the Plica Tube or Waterproof Plica Tube (trade names) made by Sankei Manufacturing can be used.

Two-stage push-button manipulation switches 11 are provided to the front face of the cuboid remote casing 10. When lightly pressed, the manipulation switches 11 do not stay in place, and return under spring force when released. When pressed firmly, they stay down, and return under spring force when pressed firmly again. An optical type of rotary encoder (serving as the casing direction identification means) is built into the rotary connector 12. The manipulation remote 9 pertaining to Embodiment 1 is made up of the remote casing 10 having these manipulation switches 11, and the rotary connector 12 that rotatably connects the remote casing 10 to the communication cable 8.

As shown in FIG. 2, the winder 5 has a pair of wheels 14 provided on either side of the crane girder 4. These wheels 14 are driven and rotated by a lateral motion motor (Y axis motor) 13, so that the winder 5 moves laterally along the crane girder 4. The lateral travel unit is such that a winder main body 17 hangs down from and is supported by a support member 15, and a winding motor (Z axis motor) 16 for winding up or playing out the support cable 6 is attached to the winder main body 17.

Travel wheels and travel motors (X axis motors) (not shown) are provided to the saddles 3A and 3B that travel over travel rails 2A and 2B and support the ends of the crane girder 4 shown in FIG. 1. The winder main body 17 shown in FIG. 2 has a built-in motor drive control circuit for driving the X axis motor, the Y axis motor 13, and the Z axis motor 16 according to the manipulation of the manipulation remote 9.

The structure of the manipulation remote 9 pertaining to Embodiment 1 will now be described through reference to FIG. 3A. As shown in FIG. 3A, the remote casing 10 is attached via the rotary connector 12 so as to be rotatable over 360 degrees with respect to the communication cable 8. The large manipulation switch 11 in the middle is provided to the front face of the remote casing 10, and an up switch 11A and a down switch 11B (serving as the up and down switches) are provided above and below this.

As discussed above, an optical rotary encoder is provided as the casing direction identification means in the interior of the rotary connector 12, and the way and how many times the remote casing 10 turns are measured with respect to a reference direction (in Embodiment 1, a direction in which the remote casing 10 is parallel to the crane girder 4 as shown in FIG. 1), and this rotational angle data is sent as an electrical signal through a communication cable built into the communication cable 8 to the motor drive control circuit built into the winder main body 17.

When the manipulation switch 11 is lightly pressed, an electrical signal indicating that the manipulation switch 11 has been lightly pressed is sent through a communication cable built into the communication cable 8 to the motor drive control circuit built into the winder main body 17, the X axis motor and/or the Y axis motor 13 is actuated under the control of the motor drive control circuit, and the hook 7 (the moving body) moves horizontally in the exact opposite direction from the direction of the remote casing 10, that is, the front face of the remote casing 10.

The control of the motor drive control circuit will be described through reference to FIGS. 1 to 4.

As shown in FIGS. 1 to 4, the manipulation switch 11, the up switch 11A, and the down switch 11B are provided to the remote casing 10 that is part of the manipulation remote 9, and a rotary encoder (optical rotary encoder) 19 is built as a casing direction identification means into the rotary connector 12. The motor drive control circuit 18 built into the winder main body 17 is constituted by a microprocessor 20 and an inverter (or contactor) 21.

The microprocessor 20 here comprises a CPU (central processing unit), ROM, RAM, or other such memory apparatus, and an input/output (I/O) apparatus, receives electrical signals sent from the remote casing 10 through the communication wire in the communication cable 8, performs necessary or desired computation, and outputs the processing result as an electrical signal to the inverter (or contactor) 21. The microprocessor 20 may be what is known as a one-chip microprocessor, or may be made up of a plurality of chips, elements, and parts.

The optical rotary encoder 19 measures which way and how many times the remote casing 10 turns from a home position with respect to the communication cable 8, and sends the measurement value as an electrical signal through the communication wire in the communication cable 8 to the microprocessor 20. When the manipulation switch 11 is pressed, a specific electrical signal is sent through the communication wire in the communication cable 8 to the microprocessor 20, the microprocessor 20 sends a control signal to the inverter (or contactor) 21, the inverter (or contactor) 21 supplies drive current to the X axis motor 23 and/or the Y axis motor 13 according to the control signal, the X axis motor 23 and/or the Y axis motor 13 is driven, and the hook 7 serving as the moving body is moved in the direction in which the remote casing 10 is facing.

The motor drive control circuit 18 that includes the inverter 21 and the microprocessor 20 performs drive control of the X axis motor 23 and/or the Y axis motor 13, and a contactor 22 controls the drive of the Z axis motor 16.

Therefore, the motor drive control circuit 18 and the contactor 22 constitute a drive control apparatus 61, and this drive control apparatus 61 and the manipulation remote 9 constitute a movement manipulation apparatus 60 including the communication cable 8 in FIG. 1.

The X axis motor 23, the Y axis motor 13, and the Z axis motor 16 correspond to a movement mechanism 62.

Here, when the inverter 21 is used, continuously variable control of the amount of drive current supplied to the X axis motor 23 and the Y axis motor 13 is possible, so the winder 5 can be moved linearly in the direction in which the remote casing 10 is facing, but when the contactor 22 is used, since the amount of drive current supplied to the X axis motor 23 and the Y axis motor 13 should remain the same, the direction of movement of the hook 7 of the winder 5 should be a direction parallel to the travel rails 2A and 2B, a direction parallel to the crane girder 4, or a direction that is intermediate to these, for a total of eight directions. Therefore, if observed closely, the hook 7 of the winder 5 travels in a zigzag path while moving in the direction in which the remote casing 10 is facing.

When the up switch 11A and down switch 11B serving as the up and down switches and provided to the manipulation remote 9 are pressed, a specific electrical signal is transmitted through the communication wire in the communication cable 8 to the contactor 22 built into the winder main body 17, just as with the motor drive control circuit 18, and drive current is supplied from the contactor 22 to the Z axis motor 16. When the up switch 11A is pressed, the Z axis motor 16 winds up the support cable 6 and raises the hook 7, and when the down switch 11B is pressed, the Z axis motor 16 plays out the support cable 6 and lowers the hook 7.

Therefore, an operator operating the overhead crane 1 shown in FIG. 1 first presses the down switch 11B on the manipulation remote 9 to actuate the Z axis motor 16 and lower the hook 7, attaches the hook 7 to the load sitting on the floor, then presses the up switch 11A to actuate the Z axis motor 16 and wind up the support cable 6 until the load is hanging high enough that its movement in the horizontal direction will not be impeded. Then, the operator aims the remote casing 10 in the direction in which the load is to be moved, lightly presses the manipulation switch 11, and fine tunes the orientation of the remote casing 10 while watching the movement direction of the load hanging on the hook 7 and moving. This allows the load to be moved in horizontally in the desired direction.

When the operator lets go of the manipulation switch 11, the manipulation switch 11 returns by spring force and the hook 7 of the winder 5 stops. After confirming that the load is moving in the proper direction, the operator presses the manipulation switch 11 firmly so that the manipulation switch 11 stays down, after which the electrical signal for the direction of the remote casing 10 is no longer transmitted, and a change in the orientation of the remote casing 10 will not affect the direction in which the hook 7 of the winder 5 moves.

When the load hanging from the hook 7 of the winder 5 has thus been moved horizontally to the desired location, the operator lets go of the manipulation switch 11 (if it had been lightly pressed) or presses it firmly again (if the manipulation switch 11 was fixed in place) to return the manipulation switch 11 and stop the hook 7 of the winder 5, and presses the down switch 11B to actuate the Z axis motor 16 in the direction of lowering the hook 7, so that the support cable 6 is played out and the load descends under its own weight, thereby being lowered to the specified location.

Thus, with the overhead crane 1 pertaining to Embodiment 1, since the hook 7 of the winder 5 is moved in the direction of the remote casing 10 by pressing the manipulation switch 11, there is no need for the operator to look at his hands, and he can adjust the orientation of the remote casing 10 while watching the movement direction of the load, so he can move the load to the desired location without taking his eyes of the load hanging from the hook 7 of the winder 5.

Therefore, even a novice can operate the overhead crane 1 quickly, safely, and reliably, and since the remote casing 10 can have only three switches (the manipulation switch 11, the up switch 11A, and the down switch 11B), even if the remote casing 10 should become soiled (e.g., dirty, covered, or otherwise obstructed from view) through use in a painting facility or the like, there will be no risk of pressing the wrong switch.

Since there is no need to look at his hands, an operator can manipulate a load hanging from the hook 7 of the winder 5 while watching the movement of the load, the overhead crane 1 can be obtained with which even a novice can manipulate easily, safely, reliably, and quickly.

In Embodiment 1, a situation was described in which the manipulation switch 11 was one that can be pressed in two stages, when pressed down firmly the manipulation switch 11 stayed down, and thereafter a change in the orientation of the remote casing 10 did not affect the movement direction of the hook 7 of the winder 5, but the switch does not necessarily have to be one that can be pressed in two stages, and may be a type with which the movement direction of the hook 7 of the winder 5 varies according to the orientation of the remote casing 10 as long as the manipulation switch 11 is held down.

Next, a manipulation remote in a crane apparatus pertaining to a modification of Embodiment 1 will be described through reference to FIG. 3B.

The manipulation remote 9 pertaining to Embodiment 1 above had only one manipulation switch 11, as shown in FIG. 3A, and the remote casing 10 had to be turned 180 degrees and the manipulation switch 11 pressed in order to make the hook 7 of the winder 5 move backwards. Specifically, to move the hook 7 of the winder 5 in all directions in the horizontal plane, the remote casing 10 had to be rotated 360 degrees.

In contrast, as shown in FIG. 3B, with a manipulation remote 9A pertaining to a modification of Embodiment 1, a second manipulation switch 11C is provided to the rear face of the manipulation switch 11. When the second manipulation switch 11C is pressed, the microprocessor 20 in FIG. 4 performs control so that the hook 7 of the winder 5 will be moved in the opposite direction from the direction of the remote casing 10 (180 degree direction).

Consequently, when the hook 7 of the winder 5 is to be moved backward, this can be reliably accomplished by pressing the second manipulation switch 11C without moving the remote casing 10. Therefore, when the two manipulation switches 11 and 11C are used in conjunction, the remote casing 10 only need be rotated within a range of 180 degrees to move the hook 7 of the winder 5 in all directions in the horizontal plane.

Thus, with the overhead crane pertaining to this modification of Embodiment 1, the crane can be operated while watching the movement of the load hanging from and conveyed by the hook 7 of the winder 5, even a novice can operate the crane easily, safely, reliably, and quickly, and the operator does not have to move as far, so the work is easier.

Furthermore, with this modification of Embodiment 1, the manipulation switch 11 and/or the second manipulation switch 11C may be a type that can be pressed in two stages, so that the switch stays down when pressed firmly, and thereafter a change in the orientation of the remote casing 10 does not affect the movement direction of the hook 7 of the winder 5, or so that the movement direction of the hook 7 of the winder 5 varies according to the orientation of the remote casing 10 as long as the manipulation switch 11 or the second manipulation switch 11C is held down.

Embodiment 2

Next, an overhead crane will be described through reference to FIGS. 5 and 6, as an example of a three-dimensional movement apparatus pertaining to Embodiment 2 of the presently disclosed subject matter.

FIG. 5 is an oblique view of the overall configuration of an overhead crane, which is an example of the three-dimensional movement apparatus pertaining to Embodiment 2 of the presently disclosed subject matter.

FIG. 6 is an oblique view of the manipulation remote in the three-dimensional movement apparatus pertaining to Embodiment 2 of the presently disclosed subject matter.

The overhead crane 1A pertaining to Embodiment 2 of the presently disclosed subject matter has the same external appearance as the overhead crane 1 in Embodiment 1 shown in FIG. 1, except for the portion of a manipulation remote 35, so portions that are the same are numbered the same as in FIG. 1 and will not be described in detail again. The constitution of the motor drive control circuit is also the same as that in Embodiment 1 shown in FIG. 4, except for the different structure of the manipulation switches, so will be discussed through reference to FIG. 4 and will not be described in detail again.

As shown in FIG. 5, with the overhead crane 1A pertaining to Embodiment 2, just as discussed in Embodiment 1, a manipulation remote 35 having a flat remote casing 36 different from that in Embodiment 1 is attached to the lower end of a communication cable 8 having a tube that will bend but not twist. The remote casing 36 is attached via a rotary connector 12 rotatably with respect to the communication cable 8, and a cross key 37 (manipulation switch) is provided in the middle of the front face of the remote casing 36.

Next, the configuration of the manipulation remote 35 will be described in reference to FIG. 6.

As shown in FIG. 6, with the manipulation remote 35 pertaining to Embodiment 2, the cross key 37 is provided as a manipulation switch, as mentioned above, in the middle of the front face of the remote casing 36, and an up switch 38A and a down switch 38B are provided as up and down switches above and below the cross key 37. The upper part 37A, lower part 37B, left part 37C, and right part 37D of the cross key 37 can all be of a type that can be pressed in two stages, so that when pressed lightly, they return under spring force upon being released, and when pressed down firmly, they stay in place, and return under spring force when pressed firmly again.

As shown in FIG. 4, a rotary encoder (optical rotary encoder) 19 provided inside the rotary connector 12, and data indicating which way and how many times the remote casing 36 has been turned from an initial position with respect to the communication cable 8 (in Embodiment 2, the direction in which the remote casing 36 is facing parallel to the crane girder 4, as shown in FIG. 5) is sent as an electrical signal through a communication wire in the communication cable 8 to the microprocessor 20 in the winder main body 17.

Here, the cross key 37 serving as the manipulation switch shown in FIG. 6 is controlled by the microprocessor 20 and the inverter (or contactor) 21 so that the hook 7 of the winder 5 moves horizontally in the direction of the remote casing 36 when the upper part 37A is pressed, the hook 7 of the winder 5 moves horizontally in the opposite direction from the direction of the remote casing 36 (180 degree direction) when the lower part 37B is pressed, the hook 7 of the winder 5 moves horizontally in the 90 degree left direction with respect to the remote casing 36 when the left part 37C is pressed, and the hook 7 of the winder 5 moves horizontally in the 90 degree right direction with respect to the remote casing 36 when the right part 37D is pressed.

Therefore, the hook 7 of the winder 5 can be moved in all directions over 360 degrees in the horizontal plane merely by rotating the remote casing 36 within a range of 90 degrees to the left or right from its initial position.

Thus, when the hook 7 of the winder 5 is to be moved horizontally to the desired position, the cross key 37 serving as the manipulation switch is released (when lightly held down) or is pressed firmly again (when pressed firmly and fixed in place) to return the cross key 37 and stop the hook 7 of the winder 5, and when the down switch 38B is pressed, an electrical signal is sent through the communication wire in the communication cable 8 to the contactor 22 inside the winder main body 17, drive current is supplied by the contactor 22 to the Z axis motor 16, the Z axis motor 16 is driven in the direction of lowering the hook 7, and the support cable 6 is played out so that the load descends under its own weight to the specified location.

Thus, with the overhead crane 1A pertaining to Embodiment 2, since the hook 7 of the winder 5 moves in a specific direction with respect to the direction of the remote casing 36 when the upper part 37A, lower part 37B, left part 37C, or right part 37D of the cross key 37 serving as the manipulation switch is pressed, there is no need for the operator to look at his hands, and he may adjust the orientation of the remote casing 36 while watching the movement direction of the load, so he can move the load to the desired location without taking his eyes off the load hanging from the hook 7 of the winder 5.

Thus, with the overhead crane 1A pertaining to this modification of Embodiment 2, there is no need for the operator to look at his hands, and he can operate the crane while watching the movement of the load hanging from and conveyed by the hook 7 of the winder 5, even a novice can operate the crane easily, safely, reliably, and quickly, and the work is easier.

With Embodiment 2, a situation was described in which the parts 37A, 37B, 37C, and 37D of the cross key 37 serving as the manipulation switch were a type that can be pressed in two stages, when pressed down firmly the they stayed down, and thereafter a change in the orientation of the remote casing 36 did not affect the movement direction of the hook 7 of the winder 5, but the switches do not necessarily have to be a type that can be pressed in two stages, and may be a type with which the movement direction of the hook 7 of the winder 5 varies according to the orientation of the remote casing 36 as long as the parts 37A, 37B, 37C, and 37D of the cross key 37 are held down.

Embodiment 3

An overhead crane will now be described through reference to FIGS. 7 to 9, as an example of the three-dimensional movement apparatus pertaining to Embodiment 3 of the presently disclosed subject matter.

FIG. 7 is an oblique view of the overall configuration of an overhead crane, which is an example of the three-dimensional movement apparatus pertaining to Embodiment 3 of the presently disclosed subject matter. FIG. 8 is an oblique view of the manipulation remote in the three-dimensional movement apparatus pertaining to Embodiment 3 of the presently disclosed subject matter. FIG. 9 is an oblique view of the manipulation remote in a modification of the three-dimensional movement apparatus pertaining to Embodiment 3 of the presently disclosed subject matter.

The overhead crane 1B pertaining to Embodiment 3 of the presently disclosed subject matter has the same external appearance as the overhead crane 1 in Embodiment 1 shown in FIG. 1 except for a manipulation remote 40, so portions that are the same are numbered the same and will not be described in detail again. The constitution of the motor drive control circuit is also the same as that in Embodiment 1 shown in FIG. 4, except for the different structure of the manipulation switches and that the rotary encoder is an absolute encoder, so will be discussed through reference to FIG. 4 and will not be described in detail again.

As shown in FIG. 7, with the overhead crane 1B, which is an example of a three-dimensional movement apparatus pertaining to Embodiment 3, just as discussed n Embodiment 1, the manipulation remote 40 having a flat remote casing 41 and provided with a grip portion that is different than those in Embodiment 1 and Embodiment 2 is attached to the lower end of a communication cable 8 having a tube that will bend but not twist. The remote casing 41 is attached via a rotary connector 12 rotatably with respect to the communication cable 8 and perpendicular to the flat plane, and a cross key 42 (manipulation switch) is provided in the middle of the top face of the remote casing 41.

Next, the configuration of the manipulation remote 40 will be described in reference to FIG. 8.

As shown in FIG. 8, with the manipulate remote 40 pertaining to Embodiment 3, the cross key 42 is provided as a manipulation switch to the top face of the remote casing 41, and a rotary up and down switch 43 that doubles as a grip is provided to the distal end of the remote casing 41. The upper part 42a, lower part 42b, left part 42c, and right part 42d of the cross key 42 can all be designed so that when held down, a specific electrical signal is sent to the microprocessor 20 through the communication wire in the communication cable 8, and they return under spring force upon being released.

Even if the operator holds down the remote casing 41 with one hand, the up and down switch 43 is designed not to turn unless the operator exerts force with the other hand. When the switch is turned to the right, the hook 7 rises, and when it is turned to the left, the hook 7 descends, and the words "up" and "down" are clearly indicated along with arrows on the surface of the up and down switch 43. This indication may be accomplished by engraving.

Further, an optical rotary encoder (optical absolute encoder) 19 is built as a casing direction identification means into the rotary connector 12, and data indicating absolute angle information for the remote casing 41, which tells how many turns the remote casing 41 has made from its initial position with respect to the communication cable 8, is sent through the communication wire in the communication cable 8 to the microprocessor 20 inside the winder main body 17. The remote casing 41 can rotate to any position 360 degrees around the communication cable 8, as indicated by the imaginary lines (dotted lines) and arrows, but no matter in which direction it is turned, it is controlled by the microprocessor 20 shown in FIG. 4 so that when the upper part 42a of the cross key 42 (manipulation switch) is pressed, the hook 7 of the winder 5 moves in the direction in which the upper part 42a of the manipulation switch 42 is facing.

Specifically, since data about the direction in which the remote casing 41 is currently facing is constantly being sent by the rotary encoder (absolute encoder) 19 to the microprocessor 20, when an electrical signal indicating that the upper part 42a of the cross key 42 (manipulation switch) is pressed sent to the microprocessor 20, the microprocessor 20 sends a control signal to the inverter or (contactor) 21 so that the hook 7 of the winder 5 will move forward in the direction in which the remote casing 41 is facing at that point, and drive current is supplied from the inverter or (contactor) 21 to the X axis motor 23 and the Y axis motor 13.

Similarly, when the lower part 42b of the cross key 42 (manipulation switch) is pressed, the hook 7 of the winder 5 is controlled to move horizontally in the opposite direction from the direction in which the remote casing 41 is facing at this point; when the left part 42c of the cross key 42 is pressed, the hook 7 of the winder 5 is controlled to move horizontally in a direction 90 degrees to the left with respect to the direction in which the remote casing 41 is facing at this point; and when the right part 42d of the cross key 42 is pressed, the hook 7 of the winder 5 is controlled to move horizontally in a direction 90 degrees to the right with respect to the direction in which the remote casing 41 is facing at this point.

Therefore, the hook 7 of the winder 5 can be moved in all directions over 360 degrees within the horizontal plane merely by rotating the remote casing 41 within a range of 90 degrees to the right or left from its initial position, and the operator can operate the remote after turning to a position that affords easy manipulation, so he does not have to move as far and the manipulation is easier.

Thus, when the hook 7 of the winder 5 is to be moved horizontally to the desired position, the cross key 42 serving as the manipulation switch is released to stop the hook 7 of the winder 5, and when the up and down switch 43 is turned to the left, an electrical signal is sent through the communication cable 8 to the contactor 22 inside the winder main body 17, drive current is supplied by the contactor 22 to the Z axis motor 16, the Z axis motor 16 is driven in the direction of lowering the hook 7, and the support cable 6 is played out so that the load descends under its own weight to the specified location.

Thus, with the overhead crane 1B pertaining to Embodiment 3, since the hook 7 of the winder 5 moves in a specific direction with respect to the direction of the remote casing 41 when the upper part 42a, lower part 42b, left part 42c, or right part 42d of the cross key 42 serving as the manipulation switch is pressed, there is no need for the operator to look at his hands, and he may adjust the orientation of the remote casing 41 while watching the movement direction of the load, so he can move the load to the desired location without taking his eyes off the load hanging from the hook 7 of the winder 5.

Thus, with the overhead crane 1B pertaining to Embodiment 3, there is no need for the operator to look at his hands, and he can operate the crane while watching the movement of the load hanging from and conveyed by the hook 7 of the winder 5, even a novice can manipulate the crane easily, safely, reliably, and quickly, and the work is easier.

Furthermore, with the overhead crane 1B pertaining to Embodiment 3, since an absolute encoder is used as the casing direction identification means, that is, an encoder that not only measures the rotational direction and angle as with an ordinary rotary encoder, but also can detect the absolute direction in which the remote casing is currently facing, when the main power supply to the overhead crane 1B is shut off when the work is finished, interrupted, etc., and the main power supply to the overhead crane 1B is then turned back on, the absolute encoder can instantly detect the direction in which the remote casing 41 is facing, so there is no need for resetting every time the main power supply to the overhead crane 1B is turned off and on, and manipulation of the overhead crane 1B can start right away.

Next, a manipulation remote 40A pertaining to a modification of Embodiment 3 will be described through reference to FIG. 9. As shown in FIG. 9, the overall structure of the manipulation remote 40A pertaining to this modification of Embodiment 3 is similar to that of the manipulation remote 40 shown in FIG. 8. What is different is that a grip 44 fixed to the remote casing 41 does not rotate or double as the up and down switch of the winder main body 17, and instead, as shown in FIG. 9, an up switch 43A and a down switch 43B are provided independently to a side face of the remote casing 41.

Consequently, as shown in FIG. 8, there is no need for the operator to first make sure which direction lowers the hook 7 when the grip (up and down switch) 43 is turned, so the up switch 43A shown in FIG. 9 may be pressed when the hook 7 is to be raised, and the down switch 43B may be pressed when the hook 7 is to be lowered, which means that the operator can make quicker decisions and the raising and lowering of the hook 7 with the winder main body 17 can be carried out more easily.

Thus, with the overhead crane and manipulation remote 40A pertaining to this modification of Embodiment 3, the crane can be operated while watching the movement of the load hanging from and conveyed by the hook 7 of the winder 5, even a novice can operate the crane easily, safely, and reliably, and the raising and lowering manipulations can also be carried out more reliably and quickly.

With Embodiment 3, a situation was described in which the movement direction of the hook 7 (the moving body) changed according to the orientation of the remote casing 41 as long as the parts 42a, 42b, 42c, and 42d of the cross key 42 (manipulation switch) were held down, but the parts 42a, 42b, 42c, and 42d of the cross key 42 may be a type that can be pressed in two stages, and may be a type with which the parts stay down when pressed firmly, so that the movement direction of the hook 7 (the moving body) does not vary thereafter even if the orientation of the remote casing 41 is changed.

Embodiment 4

An overhead crane will now be described through reference to FIGS. 10 and 11, as an example of the three-dimensional movement apparatus pertaining to Embodiment 4 of the presently disclosed subject matter.

FIG. 10 is an oblique view of the overall configuration of an overhead crane, which is an example of the three-dimensional movement apparatus pertaining to Embodiment 4 of the presently disclosed subject matter. FIG. 11 is an oblique view of the manipulation remote in the three-dimensional movement apparatus pertaining to Embodiment 4.

The overhead crane 1C pertaining to Embodiment 4 of the presently disclosed subject matter has the same external appearance as the overhead crane 1 in Embodiment 1 shown in FIG. 1 except for a manipulation remote 45, so portions that are the same are numbered the same and will not be described in detail again.

As shown in FIG. 10, with the overhead crane 1C pertaining to Embodiment 4, the manipulation remote 45 having a cuboid remote casing 46 that is different from that in the Embodiments 1 to 3 is attached to the lower end of a communication cable 8 having a tube that will bend but does not twist as discussed in Embodiment 1. The remote casing 46 is fixed and attached rotatably with respect to the communication cable 8, and manipulation switches 47A, 47B, 47C, and 47D are provided to the various side faces of the cuboid remote casing 46.

The configuration of the manipulation remote 45 will now be described through reference to FIG. 11. As shown in FIG. 11, with the manipulation remote 45 pertaining to Embodiment 4, as mentioned above, the remote casing 46 is fixed to the lower end of the communication cable 8, and the manipulation switches 47A, 47B, 47C, and 47D are provided to the four side faces of the remote casing 46. Also, an up switch 48A and a down switch 48B are provided as up and down switches above and below the manipulation switch 47A on the side face where the manipulation switch 47A is provided.

The side faces where the manipulation switches 47A and 47C are provided are parallel to the travel rails 2A and 2B of the overhead crane 1C, and the side faces where the manipulation switches 47B and 47D are provided are parallel to the saddles 3A and 3B of the overhead crane 1C.

Furthermore, only a contactor can be provided as a control device inside the winder main body 17, and drive current is supplied to the lateral motion motor (Y axis motor) 13 or to the X axis motor 23 (not shown) provided to the saddles 3A and 3B, so that the hook 7 of the winder 5 shown in FIG. 1 moves along the crane girder 4 to the saddle 3A side when the manipulation switch 47A is pressed, the hook 7 of the winder 5 moves along the crane girder 4 to the saddle 3B side when the manipulation switch 47C is pressed, the crane girder 4 moves upward and to the right in FIG. 1 when the manipulation switch 47B is pressed, and the crane girder 4 moves downward and to the left when the manipulation switch 47D is pressed.

Therefore, an operator operating the overhead crane 1C can move the hook 7 of the winder 5, and in turn the load, in the desired direction by pressing any of the four manipulation switches 47A, 47B, 47C, and 47D of the remote casing 46 while watching the load hanging on the hook 7, and particularly when the load is to be moved diagonally, can move the load in a zigzag pattern by alternately pressing any two of the manipulation switches 47A, 47B, 47C, and 47D.

Once the hook 7 of the winder 5 has thus been moved horizontally to the desired location, the manipulation switches 47A, 47B, 47C, and 47D are released to stop the hook 7 of the winder 5, and the down switch 48B is pressed to supply drive current to the Z axis motor 16, so that the Z axis motor 16 is driven in the direction of lowering the hook 7, the support cable 6 is played out, and the load descends under its own weight to a specific location.

Thus, with the overhead crane 1C pertaining to Embodiment 4, when the manipulation switches 47A, 47B, 47C, and 47D are pressed, the hook 7 of the winder 5 moves in the direction of the pressed switch, so the operator need not look at his hands, and can press the manipulation switches 47A, 47B, 47C, and 47D while watching the movement direction of the load, so he can move the load to the desired location without taking his eyes off the load hanging from the hook 7 of the winder 5.

Furthermore, with the overhead crane 1C pertaining to Embodiment 4, unlike with Embodiments 1 to 3, a simple structure can be used that does not involve any expensive apparatus such as an optical rotary encoder or microprocessor, so the apparatus is less expensive and is easy to install in smaller facilities, etc.

Thus, with the overhead crane 1C pertaining to Embodiment 4, since there is no need to look at his hands, an operator can manipulate a load hanging from the hook 7 of the winder 5 while watching the movement of the load, even a novice can manipulate easily, safely, reliably, and quickly, and the cost is reduced.

Embodiment 5

An overhead crane will now be described through reference to FIGS. 12 to 14, as an example of the three-dimensional movement apparatus pertaining to Embodiment 5 of the presently disclosed subject matter. FIG. 12 is an oblique view of the overall configuration of an overhead crane, which is an example of the three-dimensional movement apparatus pertaining to Embodiment 5 of the presently disclosed subject matter. FIG. 13A is a front view of the overall configuration of a remote casing of a manipulation remote in the three-dimensional movement apparatus pertaining to Embodiment 5 of the presently disclosed subject matter, and FIG. 13B is a left side view. FIG. 14 is a block diagram illustrating the control of the manipulation remote in the three-dimensional movement apparatus pertaining to Embodiment 5 of the presently disclosed subject matter.

The overhead crane 1D pertaining to Embodiment 5 of the presently disclosed subject matter has the same external appearance as the overhead crane 1 in Embodiment 1 shown in FIG. 1, except that there is no communication cable 8, and except for the manipulation remote 50 portion and the configuration of the motor drive control circuit in the winder, so portions that are the same are numbered the same and will not be described in detail again.

As shown in FIG. 12, the most prominent difference to the overhead crane 1D pertaining to Embodiment 5 is that it employs wireless manipulation, as opposed to the wired manipulation using the communication cable 8 of the overhead cranes in Embodiments 1 to 4.

Specifically, with Embodiment 5, as shown in FIG. 14, a radio wave transmitter 30 is built into a remote casing 51, a radio wave receiver 31 is built into a winder 29, and when a cross key 52 (manipulation switch) or the like in the remote casing 51 is pressed, this data is converted into a wireless signal and sent as a radio wave from the radio wave transmitter 30, the radio wave receiver 31 receives this radio wave and converts it into an electrical signal, and this is inputted to an input/output (I/O) port on the microprocessor 20 inside a motor drive control circuit 28, so that the movement of the hook 7 (the moving body) is controlled.

Therefore, while this is somewhat more expensive, movement of the hook 7 can be controlled from anywhere in the building in which the overhead crane 1D is installed, so the overhead crane 1D is safer and extremely easy to use.

First, the internal structure of the remote casing 51 and the winder 29 will be described through reference to FIG. 14. As shown in FIG. 14, with Embodiment 5, a microprocessor 27 is also built into the remote casing 51, and this microprocessor 27 is similar to the microprocessor 20 in that it is equipped with a CPU (central processing unit), ROM, RAM, or other such memory apparatus, and an input/output (I/O) apparatus. Further, a piezoelectric gyro 25 and a geomagnetism sensor 26 are built into the remote casing 51, and the bearing in which the remote casing 51 is flfacing is detected by the piezoelectric gyro 25 from the rotation of the remote casing 51.

Also, a reset button 55 is provided in addition to a manipulation switch 52, an up switch 53A, and a down switch 53B. This reset button 55 is pressed when detection of the bearing by the piezoelectric gyro 25 has become skewed, allowing the bearing of true north as measured accurately by the geomagnetism sensor 26 to be reset to the reference direction of the piezoelectric gyro 25 (the direction of a bearing of zero degrees).

Electrical signals from the piezoelectric gyro 25, the geomagnetism sensor 26, the manipulation switch 52, the up switch 53A, the down switch 53B, and the reset button 55 are inputted to the microprocessor 27, and computations are performed according to a program stored in the memory apparatus of the microprocessor 27, after which the result is sent as a control signal to the transmitter 30, and a radio wave is transmitted from the transmitter 30.

Meanwhile, the microprocessor 20 is built into the interior of the winder 29 just as in FIG. 4, an electrical signal is inputted from the receiver 31 that receives the radio wave transmitted from the transmitter 30, and computations are performed according to a program stored in the memory apparatus of the microprocessor 20, after which a control signal is sent as an electrical signal to the inverter or (contactor) 21 and the contactor 22, drive current corresponding to the control signal is supplied from the inverter or (contactor) 21 to the X axis motor 23 and the Y axis motor 13, and drive current is supplied from the contactor 22 to the Z axis motor 16.

Next, control of the movement direction of the hook 7 (moving body) in Embodiment 5 will be described through reference to FIGS. 13A and 14. In FIG. 13A, let us assume that the remote casing 51 is supported substantially horizontally. As shown in FIG. 13A, when the distal end of the remote casing 51 is facing to the west by an angle of θ degrees with respect to the zero degree direction (true north direction) of the piezoelectric gyro 25, and the upper part of the cross key 52 (manipulation switch) is pressed, the piezoelectric gyro 25 detects that the orientation is to the west by an angle of θ degrees with respect to the true north direction, and this data signal is sent to the microprocessor 27.

The microprocessor 27 thereupon determines that the remote casing 51 is facing to the west by an angle of θ degrees with respect to the true north direction, and that the upper part of the cross key 52 has been pressed, and a control signal is sent to the transmitter 30 so as to move the hook 7 to the west by an angle of θ degrees with respect to the true north direction. The control signal received by the receiver 31 upon receipt of the control signal transmitted as a wireless radio signal from the transmitter 30 is sent as an electrical signal by the microprocessor 20 to the inverter 21, and the necessary or desired drive current is supplied from the inverter 21 to the X axis motor 23 and the Y axis motor 13 so as to move the winder 29 to the west by an angle of θ degrees with respect to the true north direction.

In FIG. 13A, when the right part 52A of the cross key 52 (manipulation switch) is pressed, the microprocessor 27 determines that the remote casing 51 is facing to the west by an angle of θ degrees with respect to the true north direction, and that the right part 52A of the cross key 52 has been pressed, and a control signal is sent to the transmitter 30 so as to move the hook 7 to the west by an angle of (θ−90) degrees with respect to the true north direction, that is, to the east by an angle of (90−θ) degrees. The inverter 21 is controlled by the microprocessor 20 that has received the control signal, and necessary or desired drive current is supplied to the X axis motor 23 and the Y axis motor 13 so as to move the hook 7 to the east by an angle of (90−θ) degrees with respect to the true north direction.

In FIG. 13A, it is assumed that the remote casing 51 is supported substantially horizontally, but even if the remote casing 51 is tilted in the forward and backward direction or the left and right direction, the piezoelectric gyro 25 will detect which direction the remote casing 51 is facing in the horizontal plane, and movement of the hook 7 (the moving body) will be controlled in a similar fashion. However, if the remote casing 51 is tilted by more than about 90 degrees in the forward and backward direction or the left and right direction, the bearing cannot be corrected by the piezoelectric gyro 25, so the hook 7 (the moving body) will not move when the cross key 52 is pressed.

Therefore, an operator operating the overhead crane 1D pertaining to Embodiment 5 moves the hook 7 of the winder 29 to directly above the load by pressing any of the upper, lower, left, and right parts of the cross key 52 on the manipulation remote 50 at some place away from the hook 7 of the winder 29 and the load sitting on the floor, and aiming the remote casing 51 in the appropriate direction. Then, as shown in FIG. 13B, the down switch 53B provided to the left side face of the remote casing 51 is pressed, the Z axis motor 16 is driven, and the hook 7 is lowered until it reaches the load.

Then, the operator moves over to the load and attaches the hook 7 to the load, moves back to a position away from the load, and presses the up switch 53A provided to the left side face of the remote casing 51 as shown in FIG. 13B, which drives the Z axis motor 16 and raises the hook 7 until the load is hanging high enough that its movement in the horizontal direction will not be impeded. The operator then moves the hook 7 of the winder 29 to directly above the load by pressing any of the upper, lower, left, and right parts of the cross key 52 on the manipulation remote 50 and aiming the remote casing 51 in the appropriate direction. Once the hook 7 of the winder 29 moves to directly above the load, the cross key 52 of the manipulation remote 50 is released to stop the hook 7 of the winder 29, and the down switch 53B is pressed to drive the Z axis motor 16 and lower the hook 7 and the load to the specific place.

Thus, with the overhead crane 1D pertaining to Embodiment 5, to move the hook 7 of the winder 29 using wireless radio waves, the operator can operate the overhead crane 1D from anywhere in the building in which the overhead crane 1D is installed, so there is no need for him to look at his hands, and he can operate the crane while watching the movement of the load, so even a novice can manipulate the overhead crane 1D easily, safely, reliably, and quickly.

With the piezoelectric gyro 25 here, detection of the bearing often becomes skewed over time, so if the operator determines that detection of the bearing has become skewed, he can press the reset button 55 provided to the left side face of the remote casing 51 as shown in FIG. 13B, and reset the bearing of true north as measured accurately by the geomagnetism sensor 26 to the reference direction of the piezoelectric gyro 25 (the direction of a bearing of zero degrees).

With the overhead crane 1D pertaining to Embodiment 5, a situation was described in which the geomagnetism sensor 26 was used to compensate for skewing of bearing detection, but if the compass directions are accurately known in the building in which the overhead crane 1D is installed, then the geomagnetism sensor 26 is not required and the operator can press the reset button 55 in a state in which the remote casing 51 of the manipulation remote 50 is facing true north, allowing the accurate true north bearing to be reset to the reference direction of the piezoelectric gyro 25 (the direction of a bearing of zero degrees).

Also, in Embodiment 5, a situation was described in which the movement direction of the hook 7 (the moving body) varies according to the orientation of the remote casing 51 as long as the part 52A and so forth of the cross key 52 (manipulation switch) are held down, but the part 52A and so forth of the cross key 52 may instead be a type that can be pressed in two stages, and may be a type with which the parts stay down when pressed firmly, so that the movement direction of the hook 7 of the winder 29 does not vary thereafter even if the orientation of the remote casing 51 is changed.

Further, in Embodiment 5, a situation was described in which a radio wave communication apparatus was used as the method for wireless communication, but light can be used instead of radio waves. Light, unlike radio waves, has the disadvantage that the transmission of a signal will be blocked if there is an obstacle between the transmitter (light emitting apparatus) and the receiver (light receiving apparatus), but an advantage is that an optical communication apparatus is far less expensive than a radio wave communication apparatus. Therefore, the operating system of an overhead crane featuring wireless communication can be constructed inexpensively.

Also, since the overhead crane 1D serving as the three-dimensional movement apparatus pertaining to Embodiment 5 is operated wirelessly, the manipulation remote 50 can have its own power supply, if the power supply for the manipulation remote 50 is a rechargeable battery, the charger may be fixed within the building so that when the manipulation remote 50 is placed in the charger, the orientation of the remote casing 51 will be parallel (or perpendicular) to the travel rails 2A and 2B of the overhead crane 1D.

Consequently, when the main power supply to the overhead crane 1D is shut off when the work is finished, interrupted, etc., placing the manipulation remote 50 in the charger results in a state in which the remote casing 51 is facing a specific home direction, and resetting can be performed by turning on the main power switch provided to the manipulation remote 50, or the main power switch provided somewhere else, and driving the X axis motor 23, the Y axis motor 13, and the Z axis motor 16 so that the hook 7 is moved to a specific home position. Reliable resetting can be accomplished even when the main power switch to the overhead crane 1D is repeatedly turned off and off.

In the embodiments discussed above, only an overhead crane was described as an example of the three-dimensional movement apparatus pertaining to the presently disclosed subject matter, but the three-dimensional movement apparatus is not limited to an overhead crane. By contrast, the presently disclosed subject matter can be used in a wide range of applications, such as mobile harbor cranes, vehicle-mounted cranes, jib cranes, and various other crane apparatus, as well as aerial work platforms (including self-propelled aerial work platforms), radio-controlled airplanes and helicopters, and so on.

Also, in the above embodiments, only an example of disposing the motor drive control circuit in the winder was described, but the motor drive control circuit is not limited to being disposed in a winder, and may be disposed in the casing near the winder.

In working the presently disclosed subject matter, the configuration, shape, quantity, material, size, connection relationship, and so forth of the three-dimensional movement apparatus and other portions are not limited to what was discussed in the above embodiments, and other modes can be employed as needed.

Embodiment 6

The three-dimensional movement apparatus pertaining to Embodiment 6 of the presently disclosed subject matter will be described. This Embodiment 6 is the same as Embodiment 1 above, except that the block diagram indicating the control mechanism in the overhead crane serving as the three-dimensional movement apparatus is different. Therefore, only this block diagram will be described, through reference to FIG. 15, and the rest of the description will be omitted.

FIG. 15 is a block diagram showing the control mechanism in the overhead crane serving as the three-dimensional movement apparatus pertaining to Embodiment 6. FIGS. 1, 2, 3A, and 3B are an oblique view of the overall configuration of the overhead crane serving as the three-dimensional movement apparatus pertaining to Embodiment 6, a diagram of the structure of the winder serving as the lifting device of the overhead crane, and oblique views of the overhead crane manipulation remote and the remote casing portion in a modification thereof, respectively. Since these have already been described in Embodiment 1, only FIG. 15 will be described here.

In FIG. 15, 9 is a manipulation remote, 10 is a remote casing, 11 is a manipulation switch, 11A is an up switch, 11B is a down switch, 13 is a Y axis motor, 16 is a Z axis motor, 18 is a motor drive control circuit, 19 is a rotary encoder, 20 is a microprocessor, 21A is an inverter, and 23 is an X axis motor. The rotary encoder 19 can be replaced by a gyro mechanism. The inverter 21 is actually a combination of three inverters for controlling the drive of the X axis motor 23, the Y axis motor 13, and the Z axis motor 16.

The output signals from the manipulation switch 11, the up switch 11A, the down switch 11B, and the rotary encoder 19 are inputted to the microprocessor 20. These signals are supplied to the microprocessor 20 through a signal transmission cable 8 serving as the slender member or disposed in the slender member.

A control signal for controlling the inverter 21 is produced by the microprocessor 20 on the basis of these input signals. This control signal comes in three types, corresponding to the manipulation of the inverter 21 for controlling the drive or rotational speed of the X axis motor 23, the Y axis motor 13, and the Z axis motor 16, respectively. The inverter 21 controls the frequency and voltage of the AC power supplies of the X axis motor 23, the Y axis motor 13, and the Z axis motor 16 on the basis of these three kinds of control signal. This controls the rotation of each of the motors. As a result, with the overhead crane 1, pressing the manipulation switch 11 moves the hook 7 of the winder 5 in the direction of the remote casing 10.

Accordingly, the operator moves the hook 7 of the winder 5 in the direction of the remote casing 10 by pressing the manipulation switch 11, so he does not need to look at his hands, and may adjust the orientation of the remote casing 10 while watching the movement direction of the load, which means that he can move the load to the desired location without taking his eyes off the load hanging from the hook 7 of the winder 5.

Therefore, even a novice can operate the overhead crane 1 quickly, safely, and reliably, and since there are only three switches on the remote casing 10 (the manipulation switch 11, the up switch 11A, and the down switch 11B), even if the remote casing 10 should become soiled through use in a painting facility or the like, there will be no risk of pressing the wrong switch. Since there is no need to look at his hands, the operator can operate the crane while watching the movement of the load hanging from the hook 7 of the winder 5, and even a novice can operate the overhead crane 1 easily, safely, reliably, and quickly.

Embodiment 7

The three-dimensional movement apparatus pertaining to Embodiment 7 will be described. Just as was Embodiment 6, Embodiment 7 is the same as Embodiment 1 above, except that the block diagram indicating the control mechanism in the overhead crane serving as the three-dimensional movement apparatus is different. Therefore, only this block diagram will be described, through reference to FIG. 16, and the rest of the description will be omitted.

FIG. 16 is a block diagram showing the control mechanism in the overhead crane serving as the three-dimensional movement apparatus pertaining to Embodiment 7. FIGS. 1, 2, 3A, and 3B are an oblique view of the overall configuration of the overhead crane serving as the three-dimensional movement apparatus pertaining to Embodiment 6, a diagram of the structure of the winder serving as the lifting device of the overhead crane, and oblique views of the overhead crane manipulation remote and the remote casing portion in a modification thereof, respectively. Since these have already been described in Embodiment 1, only FIG. 16 will be described here.

In FIG. 16, 9 is a manipulation remote, 10 is a remote casing, 11 is a manipulation switch, 11A is an up switch, 11B is a down switch, 13 is a Y axis motor, 16 is a Z axis motor, 18 is a motor drive control circuit, 19 is a rotary encoder, 20 is a microprocessor, 21 and 22A are each an inverter (or contactor), and 23 is an X axis motor. The rotary encoder 19 can be replaced by a gyro mechanism. The inverter 21 is actually a combination of two inverters for controlling the drive of the X axis motor 23 and the Y axis motor 13.

The output signals from the manipulation switch 11, the up switch 11A, the down switch 11B, and the rotary encoder 19 are inputted to the microprocessor 20. These signals are supplied to the microprocessor 20 through a signal transmission cable 8 serving as the slender member or disposed in the slender member. A control signal for controlling the inverter 21 and the inverter 22A is produced by the microprocessor 20 on the basis of these input signals.

This control signal comes in three types, corresponding to the manipulation of the inverter 21 and the inverter 22A for controlling the drive or rotational speed of the X axis motor 23, the Y axis motor 13, and the Z axis motor 16, respectively. These three kinds of control signal are supplied to the inverter 21 and the inverter 22A through the signal transmission cable 8 serving as the slender member or disposed in the slender member.

The inverters 21 and 22A control the frequency and voltage of the AC power supplies of the X axis motor 23, the Y axis motor 13, and the Z axis motor 16 on the basis of these control signals. This controls the rotation of each of the motors. As a result, with the overhead crane 1, pressing the manipulation switch 11 moves the hook 7 of the winder 5 in the direction of the remote casing 10.

A control signal for controlling the inverter 21 and the inverter 22A is produced by the microprocessor 20 on the basis of these input signals. This control signal comes in three types, corresponding to the manipulation of the inverter 21 for controlling the drive or rotational speed of the X axis motor 23, the Y axis motor 13, and the Z axis motor 16, respectively. The inverters 21 and 22A control the frequency and voltage of the AC power supplies of the X axis motor 23, the Y axis motor 13, and the Z axis motor 16 on the basis of these three kinds of control signals. This controls the rotation of each of the motors. As a result, with the overhead crane 1, pressing the manipulation switch 11 moves the hook 7 of the winder 5 in the direction of the remote casing 10.

Accordingly, the operator moves the hook 7 of the winder 5 in the direction of the remote casing 10 by pressing the manipulation switch 11, so he does not need to look at his hands, and may adjust the orientation of the remote casing 10 while watching the movement direction of the load, which means that he can move the load to the desired location without taking his eyes off the load hanging from the hook 7 of the winder 5. Therefore, even a novice can operate the overhead crane 1 quickly, safely, and reliably, and since there can be only three switches on the remote casing 10 (the manipulation switch 11, the up switch 11A, and the down switch 11B), even if the remote casing 10 should become soiled through use in a painting facility or the like, there will be no risk of pressing the wrong switch. Since there is no need to look at his hands, the operator can operate the crane while watching the movement of the load hanging from the hook 7 of the winder 5, and even a novice can operate the overhead crane 1 easily, safely, reliably, and quickly.

In the block diagram of the control mechanism shown in FIGS. 14 and 15, the microprocessor 20 constitutes part of a drive control apparatus (and particularly a motor drive control circuit), but in the block diagram shown in FIG. 16, the microprocessor 20 constitutes part of the manipulation remote 9. Specifically, with the control mechanism shown in FIG. 16, the microprocessor 20, which is part of the drive control apparatus and the manipulation remote, is disposed at one end of the slender member 8, and the inverters or (contactors) 21 and 22A, which make up the rest of the drive control apparatus, as well as the X axis motor 23, the Y axis motor 13, and the Z axis motor 16 (the movement mechanism) are incorporated at the other end of the slender member 8, and constituted integrally. This configuration makes the manipulation remote 9 multi-functional, and has the secondary benefit that most of the adjustment and maintenance required or desired for controlling the movement of the moving body can be handled by adjusting and maintaining the apparatus or device disposed at one end of the slender member.

Embodiment 8

Next, the overhead crane 1 serving as the three-dimensional movement apparatus pertaining to Embodiment 8 of the presently disclosed subject matter will be described.

FIG. 17A is a simplified front view of the overhead crane pertaining to this embodiment. Those components that are the same as in the embodiment in FIG. 1 are numbered the same and will not be described again, and only the difference will be discussed below.

In this embodiment, a communication cable extending from the winder 5 to the remote casing 10 will sag under its own weight if it is itself flexible or if the slender member that serve as its case is flexible, and the bent portion can block the field of vision of the operator or get in the way of the load. In view of this, in this embodiment the slender member is made just stiff enough that it can support the main part of the communication cable while still affording freedom of movement to the remote casing 10.

In the drawings, a communication cable (slender member) that will bend but does not twist hangs down from the winder 5 to near the floor, and the remote casing 10 is connected to the lower end of this slender member.

A cargo N serving as the load is fixed via a support means 7-1 to the support cable 6 hanging down from the winder 5.

As the above-mentioned slender member, the communication cable can be formed from the same material as in the other embodiments, but a characteristic feature of this embodiment is that the slender member comprises at least two rod-like members and a connecting member that bendably connects these rod-like members.

More specifically, the slender member can be one in which the communication cable is passed through the inside of the slender member as with a flexible metal electrical wire tube or a vinyl-covered flexible metal electrical wire tube, but need not have a tubular structure, and may be a rod-like member whose cross sectional shape is circular, elliptical, or oval.

In this embodiment, as shown in the drawings, the slender member comprises four rod-like members B1, B2, B3, and B4 are disposed in series, and these are connected by connecting members 65, 66, and 67.

The connecting members can all have the same structure, so just the connecting member 67 will be described. This connecting member 67 is typically a universal joint. Specifically, a universal joint consists of two U-shaped yokes each of which is connected to the end of a shaft, and these yokes are rotatably connected to their respective shafts using revolute (turning) pair.

Consequently, the remote casing 10 is able to rotate around the axis indicated by the arrow, with respect to an imaginary center axis C extending in the lengthwise direction of the slender member B4, and as indicated by the dotted lines, is able to bend at a specific angle with respect to the axis C.

Accordingly, since a signal production means for producing a signal related to the rotational direction or rotational amount of the remote casing 10 is formed inside the remote casing 10 as mentioned above, this signal is used for control, allowing the cargo N (load) to be moved according to the rotational direction or rotational amount of the remote casing 10.

As to the direction in which the cargo N is conveyed, which is determined according to the rotational direction or rotational amount of the remote casing 10, it is possible, for example, to provide some equipment near the ceiling of the room in which the overhead crane 1 is installed so that the direction will be displayed, using an LED (light emitting diode) or other suitable light emitting means, before the cargo N is actually conveyed.

FIGS. 17A and 17B are diagrams illustrating the layout of the communication cable extending from the winder 5 to the remote casing 10.

As shown in FIG. 17A, a communication cable L is disposed substantially parallel to the slender members B2 and B3, and the parallel portions are fixed to the corresponding slender members by adhesive bonding or some other such means. The communication cable L is not fixed at the place corresponding to the connecting member 66 that links B2 and B3, and instead is looped around this place to afford freedom of movement of the connecting member 66.

Furthermore, although the communication cable L can be somewhat longer than the slender member, it should not be so long that the communication cable L sags in portions.

In the example shown in FIG. 17C, the communication cable L is make considerably longer than the slender members B2 and B3, and is partially fixed to parts of the slender members B2 and B3 at places away from the connecting member 66. An advantage to doing it this way is that the communication cable L can be attached to and removed from the slender members B2 and B3 more easily.

Embodiment 9

FIGS. 18 and 19 illustrate an embodiment related to the specific configuration of the manipulation remote 9.

FIG. 18 is a vertical cross section showing the simplified configuration of the manipulation remote 9, FIG. 19 is a cross section along the A-A line in FIG. 18, and FIG. 20 is a vertically cut away end view showing the details of the manipulation remote 9 in FIG. 18.

In these drawings, the manipulation remote 9 has a main shaft 71 that is an object that passes vertically through the interior of the remote casing 10, and the remote casing 10 is constituted so as to be able to rotate relatively as indicated by the arrow C around the axis of the main shaft 71.

The main shaft 71 either is formed integrally with the slender member 8-1 discussed in reference to FIG. 17, etc., or with the lower end of the rod-like member B4 located at the bottom of the plurality of rod-like members that constitute this slender member, or is linked or connected so as to extend in the lengthwise direction of the rod-like member B4.

In this embodiment, the remote casing 10 rotates around the main shaft 71 via ball bearings 72, 72 as shown in FIG. 20, for example. An encoder 73 is fixed to the main shaft 71 and disposed near the lower end of the main shaft 71, and the rotational shaft of the encoder 73 is linked to or integrated with the remote casing 10.

A plurality of disks are disposed at regular intervals in the lengthwise direction of the main shaft 71. In this embodiment there are three disks, and signal generation means are disposed at regular intervals around the periphery of the disks 81, 82, and 83.

In this embodiment, the signal generation means comprises, for example, a plurality of optical sensors consisting of (or comprising) paired light receiving elements. Instead of being an optical sensor, the signal generation means can be a "magnetic sensor", a "proximity sensor", or another such non-contact sensor. In this embodiment, as shown in FIG. 19, four of the optical sensors are provided (numbered 91, 92, 93, and 94) to each of the disks 81, 82, and 83.

Push buttons 74, 75, and 76 are disposed in a row as switching means (or switching apparatus), at regular intervals in the vertical direction, and corresponding to the various disks, on one face of the remote casing 10 (this one face shall be called the "front").

Although not depicted in FIG. 18, as shown in FIG. 20, these push buttons are also provided on the rear face as indicated by the numbers 77, 78, and 79.

Each push button has a baffle that is integrated with the button and is located inside the remote casing 10, as a member that works in synchronization with the button. Since the push buttons can all have the same structure, just the push button 76 will be described as an example. As shown in FIG. 20, the push button 76 sticking out from the remote casing 10 is biased outward by a coil spring or other such biasing means, and is configured as a two-stage push button, for example. That is, when pressed lightly, the push button 76 does not stay down and returns by biasing force, but when pressed firmly, it stays pressed down, and returns when pressed firmly again. Inside the remote casing 10, a baffle 86 that is integral with the push button 76 moves in and out in synchronization with the movement of the push button 76.

FIG. 21 will now be described.

As shown in this drawing, the baffle 86 that works in synchronization with the push button 76 has at its inner end a curved face with an arc that is greater than the periphery of the disk 83, and when the push button is pressed, the baffle 86 is inserted into the optical path of the light emitting elements of the optical sensors provided at 90 degree intervals on the disk 83. The structure is the same for a baffle 89 that is provided opposite the baffle 86 and provided integrally with the push button 79 in FIG. 20.

Accordingly, when the push button 79 is pressed, the baffle 86 is inserted into the optical path of the light emitting elements of the optical sensors provided at 90 degree intervals on the disk 83, and when this push button returns under biasing force, the baffle 86 comes out of the optical path of the optical sensors.

Consequently, when the push button 79 is pressed, light from the light emitting elements on the face of the baffle 86 that is opposite the optical sensors is reflected, and when the reflected light of the optical sensors is incident on the light receiving elements, it is subjected to opto-electrical conversion and detected as an electrical signal.

Specifically, as shown in FIG. 21, in the state in FIG. 21C, if the orientation of the remote casing 10 is zero degrees, then rotation of the remote casing 10 is detected by 45 degrees in FIG. 21A and by 22.5 degrees in FIG. 21B.

FIGS. 22 and 23 show the relationship between the pressing of the push button and the direction command Explanation is provided accordingly in reference to FIG. 20.

In plan view, the left side of the cuboid remote casing 10 that is longer in one direction is the forward direction, while the right side is the backward direction. In FIG. 22A, when the push button 76 is pressed in a state in which the remote casing 10 is positioned horizontally in the drawing, the baffle 86 moves in the direction of the arrow a, and the optical sensor 92 is switched, which results in indication of movement in the forward direction A.

Conversely, in FIG. 22B, when the push button 79 is pressed, the baffle 89 moves in the direction of the arrow b, and the optical sensor 94 is switched, which results in indication of movement in the backward direction B.

In contrast, in FIG. 23A, when the push button 76 is pressed in a state in which the remote casing 10 is tilted by about 45 degrees from the horizontal in the drawing, the baffle 86 moves in the direction of the arrow a, and the optical sensors 92 and 93 are switched at the same time, which results in indication of movement diagonally in the forward direction A. In FIG. 23B, when the push button 79 is pressed, the baffle 89 moves in the direction of the arrow b, and the optical sensors 91 and 94 are switched at the same time, which results in indication of movement diagonally in the backward direction B.

Thus, with this embodiment, the direction in which the casing is facing is detected from the relationship to the rotational detection position of the encoder 73, and this is used in combination with the angle information of the encoder 73 to detect whether the push button on the front side has been pressed, or the push button on the rear side has been pressed, and to determine whether the command will be for forward or backward movement.

Furthermore, because in this embodiment the electrical parts, and particularly the circuits and power supply means, are disposed along the main shaft 71 via the slender member, the remote casing 10 can rotate free of restriction and without being affected by signal wires or the like.

Also, angle information can be detected by the encoder 73 from the orientation of the remote casing 10, regardless of whether or not the push buttons have been moved forward or backward, so as described above, the direction in which the crane is traveling can be easily ascertained before the travel begins, according to the orientation of the remote casing 10, by looking at a display means provided inside the facility.

Furthermore, with this embodiment optical sensors are provided on disks that rotate along with the main shaft 71, but the optical sensors may be provided on the side where the baffle moves back and forth integrally with the push button, and a switching means that is moved in and out of the optical path of the optical sensors may be provided on the main shaft 71 side.

FIG. 24 is a block diagram of the control mechanism in an overhead crane serving as a three-dimensional movement apparatus pertaining to an embodiment when the above-mentioned optical sensors are incorporated into the manipulation remote. Basically, the structure is the same as that shown in FIG. 4, but a part of it is shown in greater detail. Therefore, the following description will focus on the characteristic features, and redundant description of the structure in FIG. 4 will be omitted.

Angle information from the encoder 73 and switch information from a manipulation switch 11-1 of the optical sensor are sent through a signal transmission driver/receiver 111 to an input interface 102, and inputted via the input interface 102 to the microprocessor 20.

The signal from a limit switch 101 (not shown), which is disposed at the end, etc., of the travel rails 2A and 2B, etc., in FIG. 1, for example, is inputted to the input interface 102, and if the movement is about to exceed the travel range, this signal is inputted through the input interface 102 to the microprocessor 20 to stop the travel.

The microprocessor 20 computes command information that is necessary or desired for the movement mechanism 62 so as to match the command corresponding to the angle information from the encoder 73 via the signal transmission driver/receiver 111 and the switch information from the manipulation switch 11-1 of the optical sensor, this is converted to command voltage by a D/A (digital/analog) converter 105, and this is imparted to inverter speed controllers 109 and 110 for the X and Y axes. The inverter speed controllers 109 and 110 drive the X axis motor 23 and the Y axis motor 13.

The microprocessor 20 also issues a command to a winder driver 108 and drives the Z axis motor 16. Further, the microprocessor 20 controls the inverter 73 via an inverter power supply controller 107. The microprocessor 20 can display the crane travel direction based on the angle information from the encoder 73 and the switch information from the manipulation switch 11-1 of the optical sensor on a display serving as the display means 106 installed in the facility, so that everyone in and/or around the facility, etc., can see the travel direction.

FIG. 25 is a flowchart of an example of the manipulation of an overhead crane serving as the three-dimensional movement apparatus in FIG. 24.

When the power is turned on, the system is actuated (ST1), a system diagnostic sequence is executed by the microprocessor 20, and it is determined whether or not the system is normal (ST2). If a positive result is obtained here, the microprocessor 20 turns on the power to the encoder 73 via the inverter power supply controller 107 (ST3), and determines whether or not the encoder 73 is normal (ST4).

If a positive result is obtained here, it is displayed that the system can operate normally (ST5), and the current position and state of the encoder 73 is confirmed from its angle information (ST6).

The encoder here may be an ordinary rotary encoder, but can also be an absolute encoder. That is, while an ordinary rotary encoder can measure the rotational direction and angle of the remote casing 10, an absolute encoder can measure the absolute direction in which the remote casing is actually facing.

Accordingly, in certain applications, there is no need for constant output of the absolute angle from the time when the power is turned on, and to perform a home point return manipulation, and the absolute angle output will remain correct as long as the encoder main body does not end up being rotated. Consequently, computation for finding the direction of the remote casing from the output signal of the encoder is easier.

In this state, if any of the push buttons is pressed on the movement manipulation apparatus 60 (the manipulation remote), the microprocessor 20 computes the crane travel direction and issues the required or desired commands as discussed above (ST8).

FIG. 26 will be described on the basis of the angle sent out by the encoder 73.

This drawing illustrates how a speed command is sent to the inverter speed controllers 109 and 110 for the X and Y axes.

In this embodiment, the encoder 73 usually can control the motor output from a stopped state up to the highest speed, in proportion to the voltage, over a voltage range of minus 10 V (volts) to 10 V (this is reversed on the negative side).

Looking from the zero degrees direction in the drawing, for the crane to travel clockwise by 250 degrees, the following voltages are inputted to the inverter speed controllers 109 and 110 of the X and Y axes, allowing travel in the direction of the arrow A in the drawing.

$X$ axis speed=minus cos 20 degrees×10 (V)=minus 9.4 (V)

$Y$ axis speed=minus sin 20 degrees×10 (V)=minus 3.4 (V)

When the push button is then switched off (ST9), the voltage inputted to the inverter speed controllers 109 and 110 of the X and Y axes is also shut off, and the travel stops (ST10).

An inverter was used as the motor drive control circuit in this embodiment.

However, an "inverter" is a motor driver for controlling the speed, torque, and braking of an AC induction motor commonly used in cranes, but it is also possible to use a "servo driver" for driving a servo motor, a "stepping motor driver" for driving a stepping motor, or the like, and the combination of motor and driver can be varied as dictated by the usage mode.

In this case, if a servo motor and a servo driver is used for each axis, for example, the microprocessor will be able to ascertain numerical values for all the positions of a parallelepiped (imaginary range) within the crane manipulation range constituted by the X, Y, and Z axes.

Consequently, when the work entails repeated back and forth movement between two points, position information for those two points, or more, can be individually stored in the microprocessor, the necessary or desired points can be called up just before the operator performs a manipulation command, and the system can easily move the crane to the specified point by sending out a manipulation command. Also, it is possible to construct a system in which multipoint registration is used to specify a registered point as a passage point, and the crane is operated while following a predetermined path.

The scope of the presently disclosed subject matter is not limited to or by the embodiments given above. The various embodiments given above may be combined with one another, or some may be omitted and the rest combined, and furthermore other technological elements not described may be combined.

BRIEF DESCRIPTION OF THE DRAWINGS

FIG. 5 is a perspective view of the overall configuration of an overhead crane, which is an example of a three-dimensional movement apparatus pertaining to Embodiment 2 made in accordance with principles of the presently disclosed subject matter;

FIG. 6 is a perspective view of a manipulation remote used in the three-dimensional movement apparatus according to Embodiment 2 as shown in FIG. 5;

FIG. 7 is a perspective view of the overall configuration of an overhead crane, which is an example of a three-dimensional movement apparatus according to Embodiment 3 of the presently disclosed subject matter;

FIG. 12 is a perspective view of the overall configuration of an overhead crane, which is an example of a three-dimensional movement apparatus according to Embodiment 5 of the presently disclosed subject matter;

FIG. 13A is a front view of the overall configuration of a remote casing of a manipulation remote in the three-dimensional movement apparatus according to Embodiment 5 of the presently disclosed subject matter, and FIG. 13B is a left side view of the same;

FIG. 14 is a block diagram illustrating the control of the manipulation remote in the three-dimensional movement apparatus according to Embodiment 5 of the presently disclosed subject matter;

Figure 1:
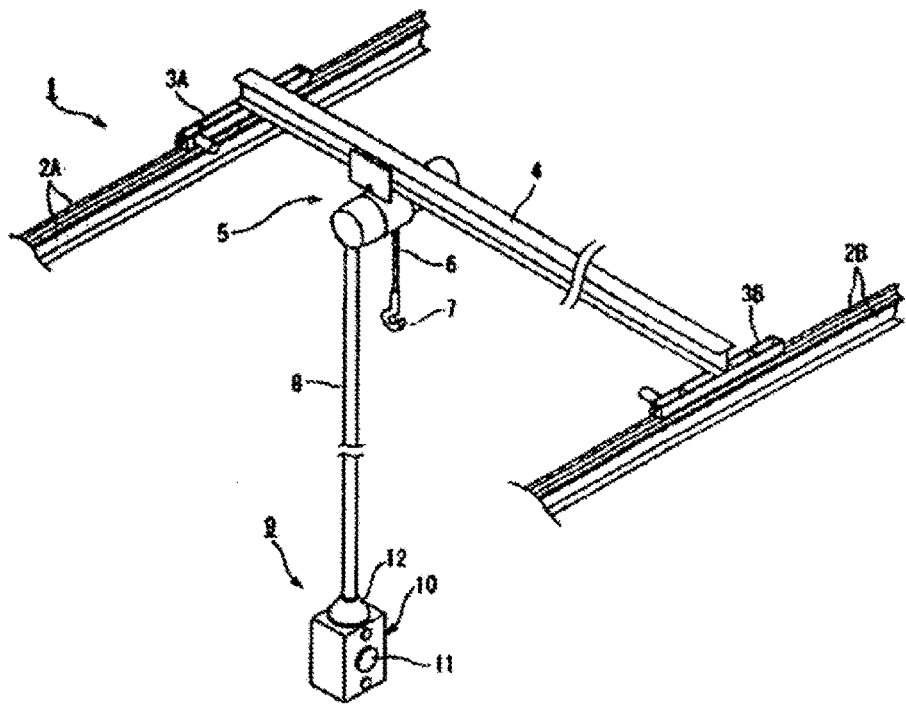
FIG. 1 is a perspective view of the overall configuration of an overhead crane, which is an example of a three-dimensional movement apparatus pertaining to Embodiment 1 made in accordance with principles of the presently disclosed subject matter.
Figure 2:
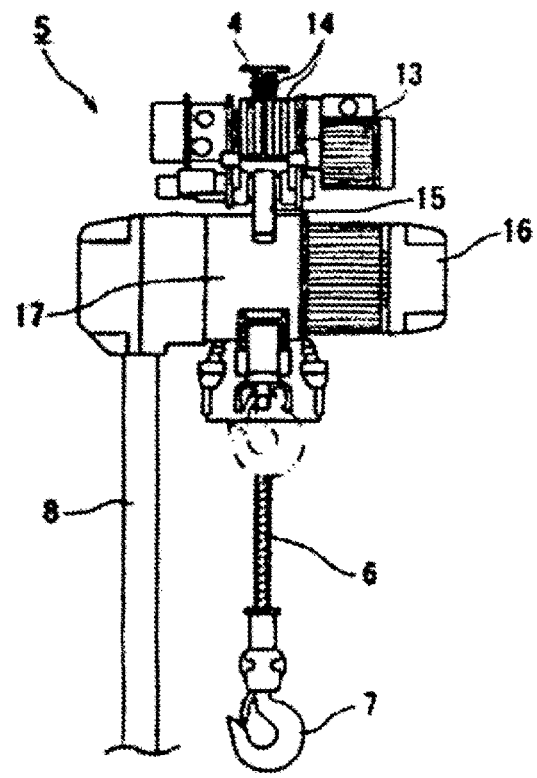
FIG. 2 is a front view of a winder serving as the lifting device of the overhead crane of FIG. 1.
Figure 3A:
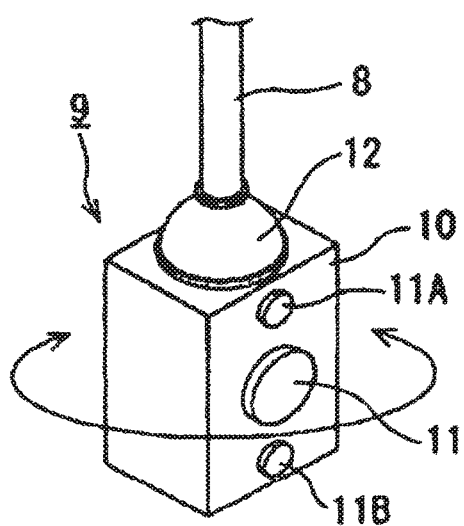
FIG. 3A is a perspective view of a remote casing portion of a manipulation remote in the three-dimensional movement apparatus of FIG. 1.
Figure 3B:
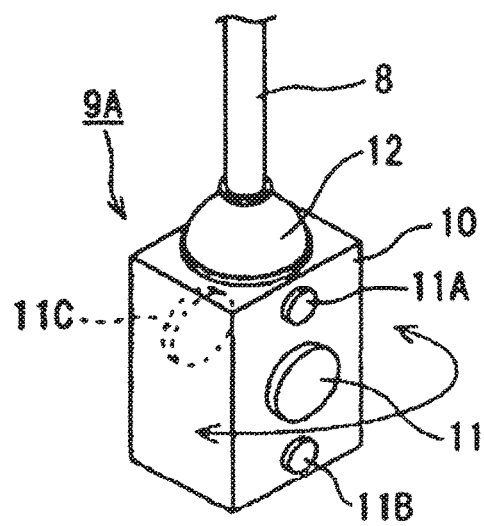
FIG. 3B is a perspective view of the remote casing portion of a manipulation remote in a three-dimensional movement apparatus pertaining to a modification of Embodiment 1 of the presently disclosed subject matter.
Figure 4:
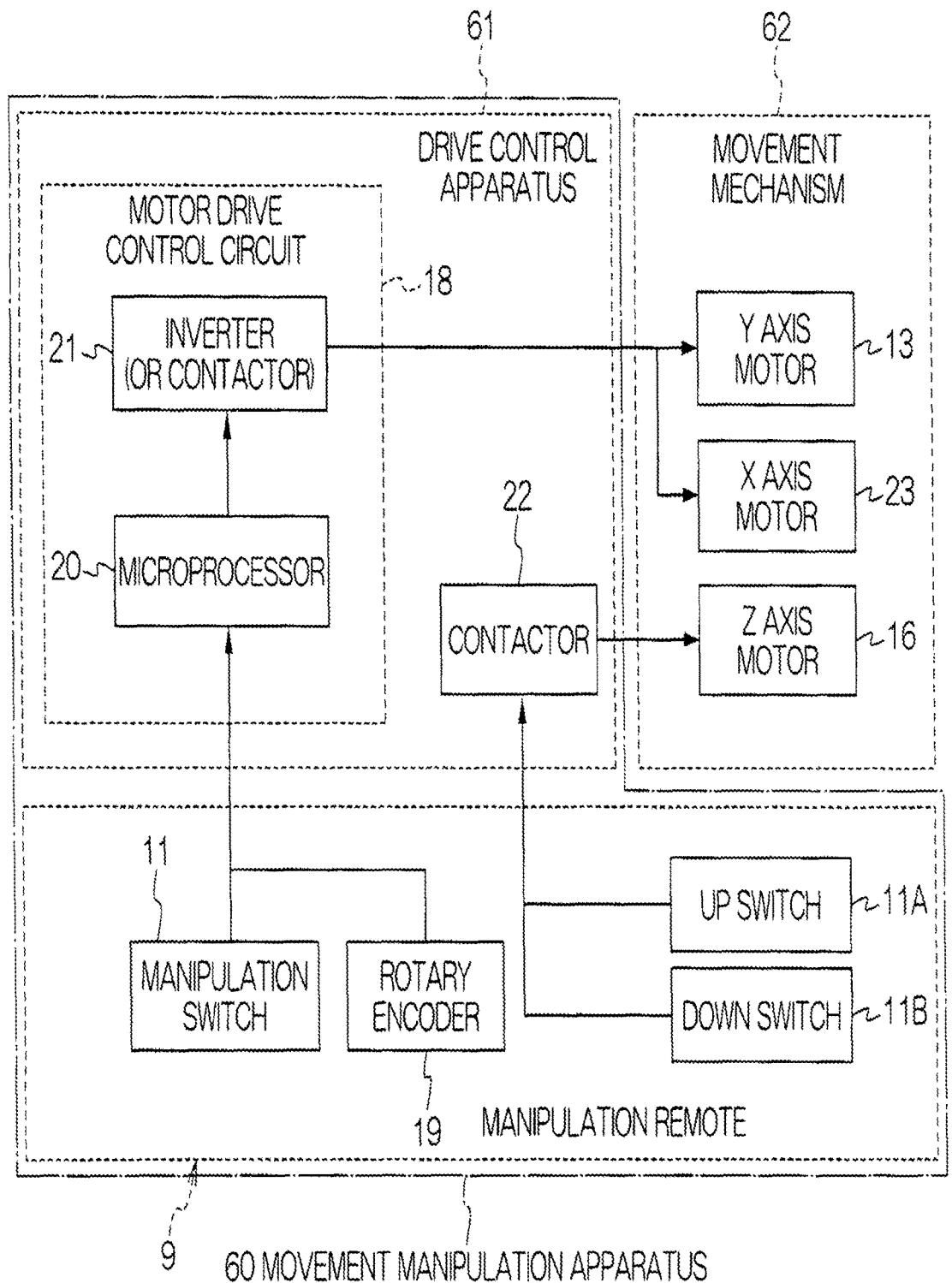
FIG. 4 is a block diagram illustrating a control mechanism used in the three-dimensional movement apparatus of FIG. 1.
Figure 8:
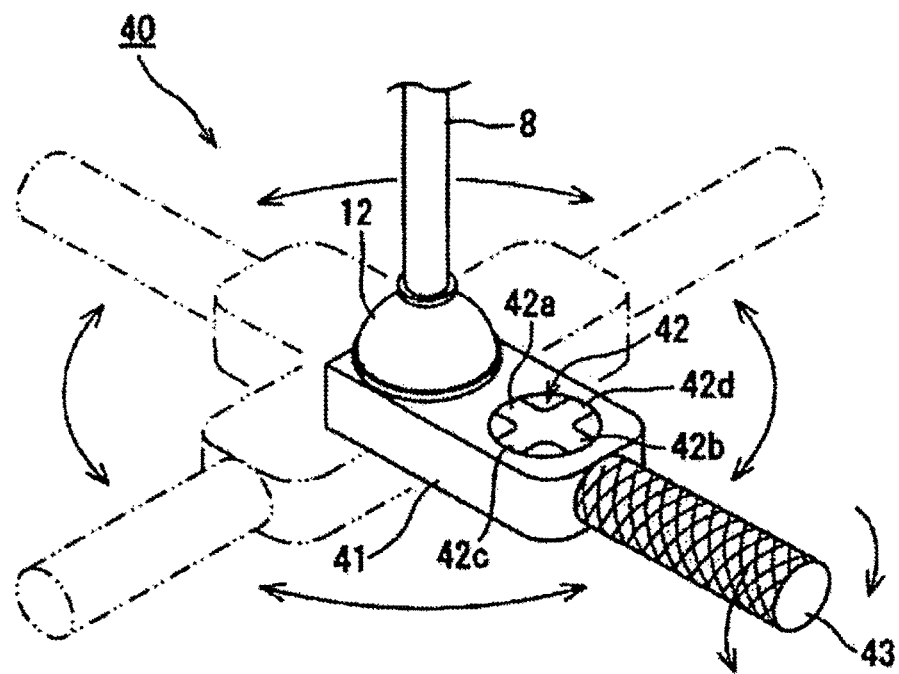
FIG. 8 is a perspective view of a manipulation remote used in the three-dimensional movement apparatus according to Embodiment 3 as shown in FIG. 5.
Figure 9:
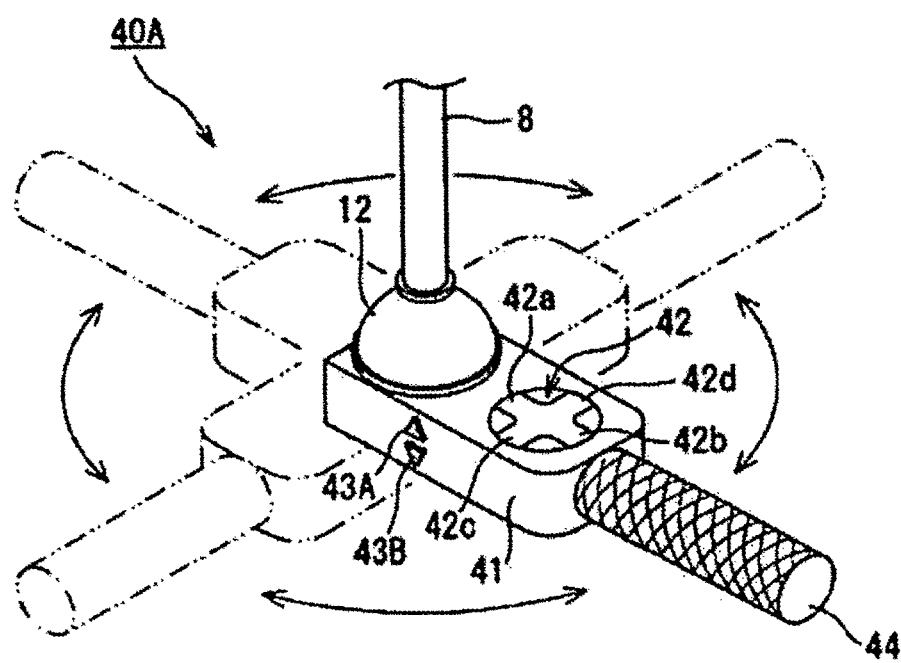
FIG. 9 is a perspective view of a manipulation remote in accordance with a modification of the three-dimensional movement apparatus of Embodiment 3 as shown in FIG. 5.
Figure 10:
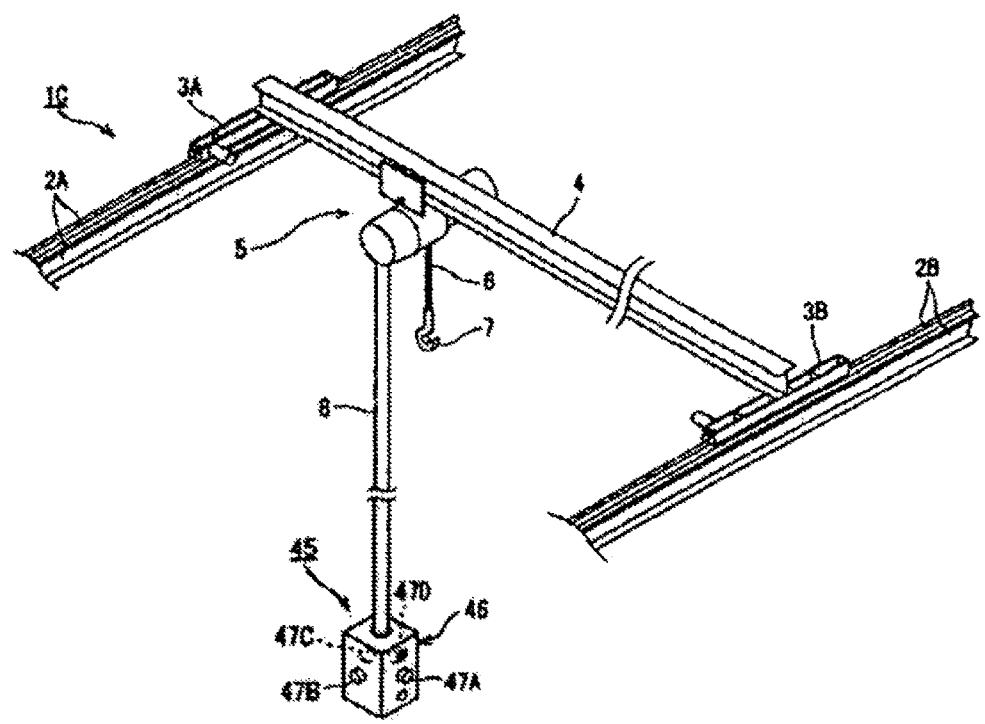
FIG. 10 is a perspective view of the overall configuration of an overhead crane, which is an example of a three-dimensional movement apparatus according to Embodiment 4 of the presently disclosed subject matter.
Figure 11:
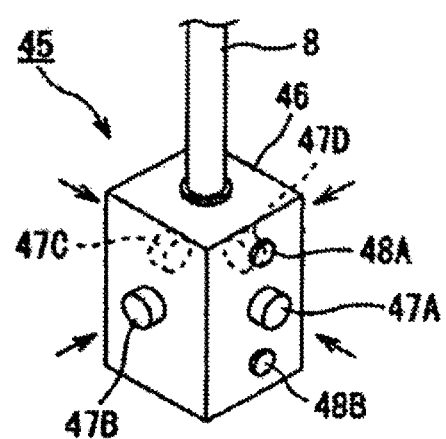
FIG. 11 is a perspective view of a manipulation remote used in the three-dimensional movement apparatus according to Embodiment 4 shown in FIG. 10.
Figure 15:
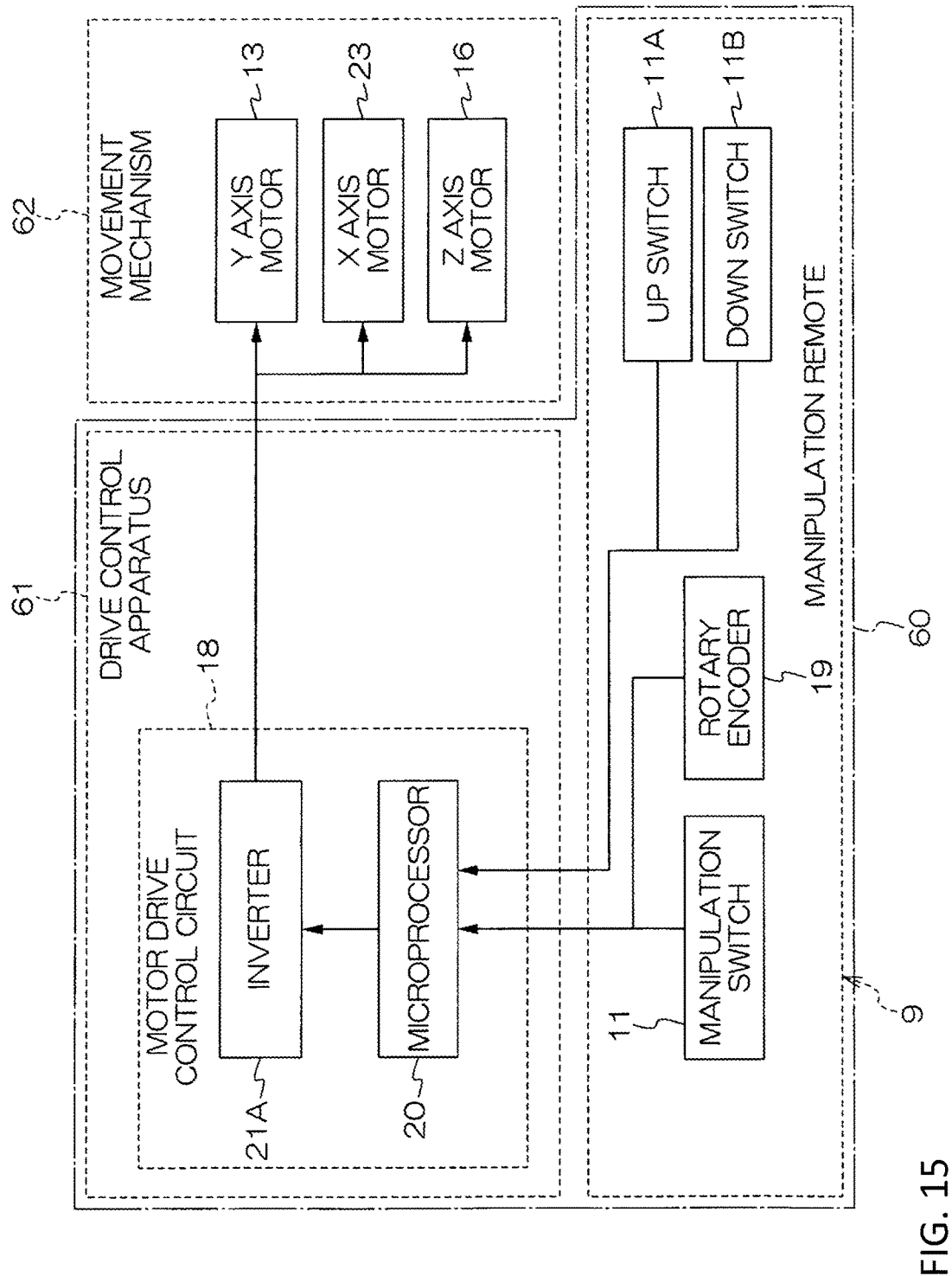
FIG. 15 is a block diagram showing the control mechanism in the overhead crane serving as the three-dimensional movement apparatus according to Embodiment 6.
Figure 16:
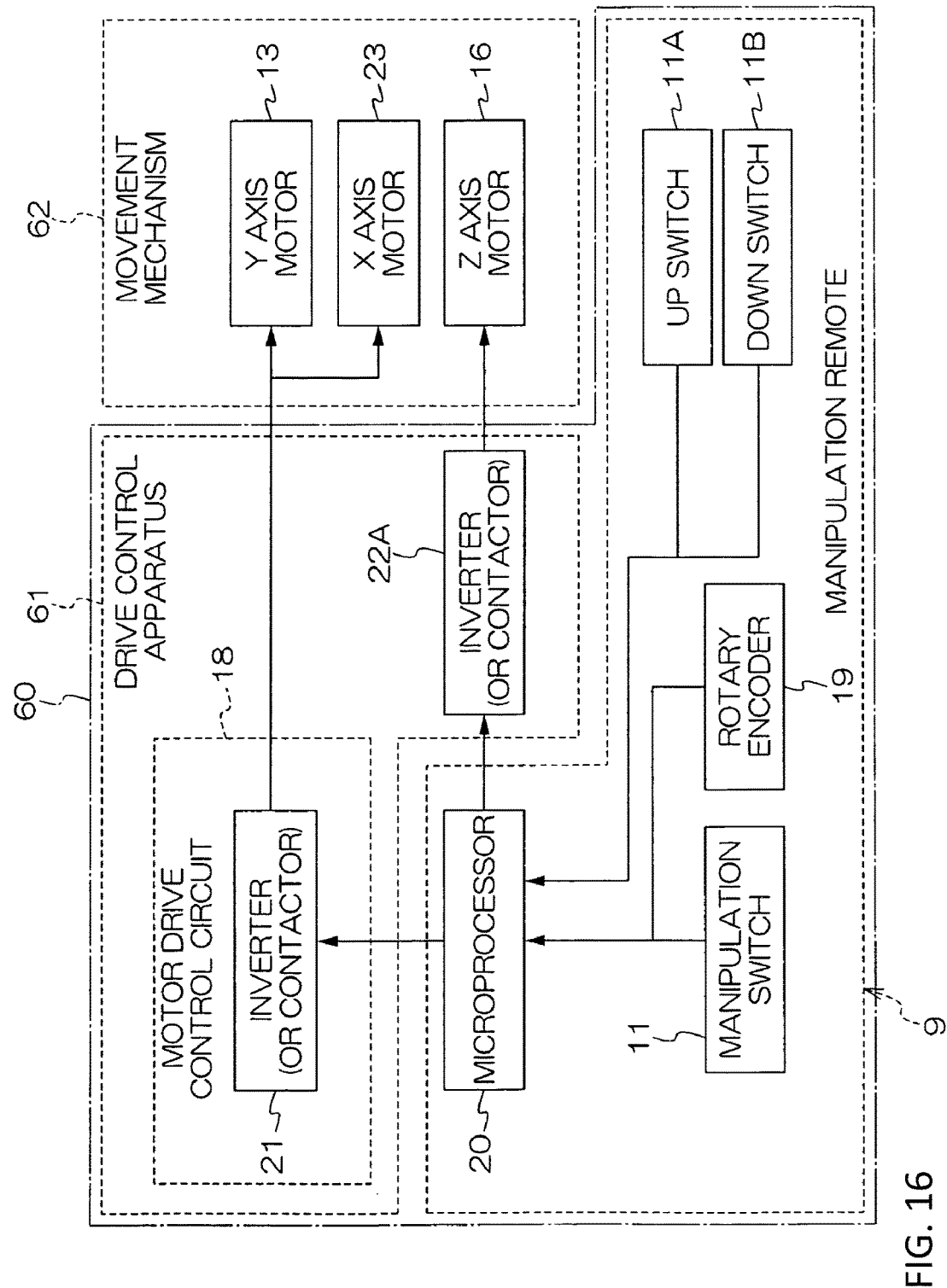
FIG. 16 is a block diagram showing the control mechanism in the overhead crane serving as the three-dimensional movement apparatus according to Embodiment 7.
Figure 17A:
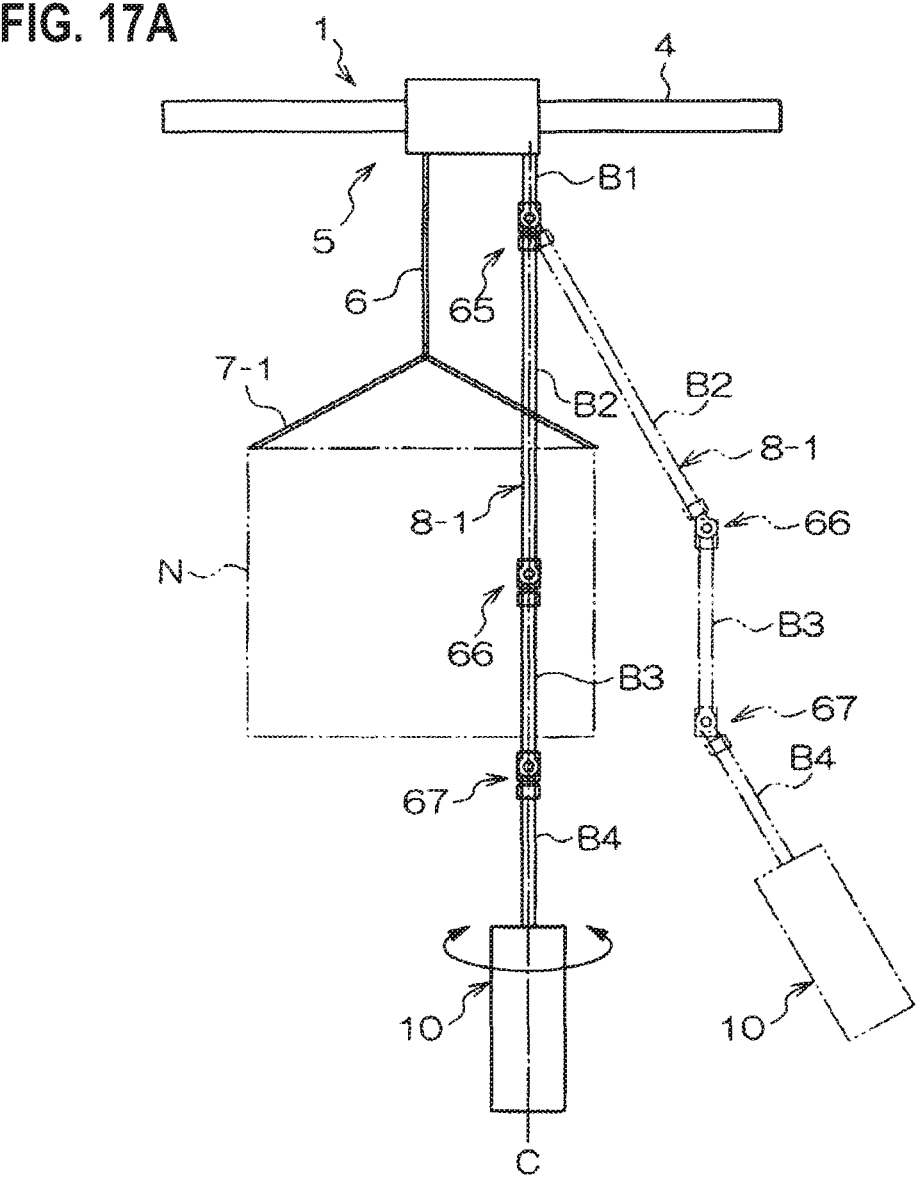
FIGS. 17A-C are a simplified front view of the overhead crane serving as a three-dimensional movement apparatus according to Embodiment 8, and close up operational views of rod-like members and connecting members, respectively.
Figure 17B:
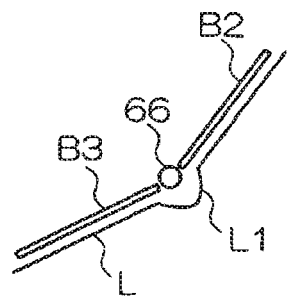
Figure 17C:
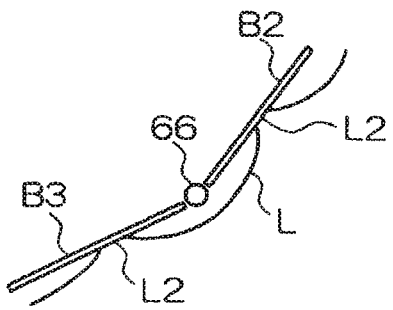
Figure 18:
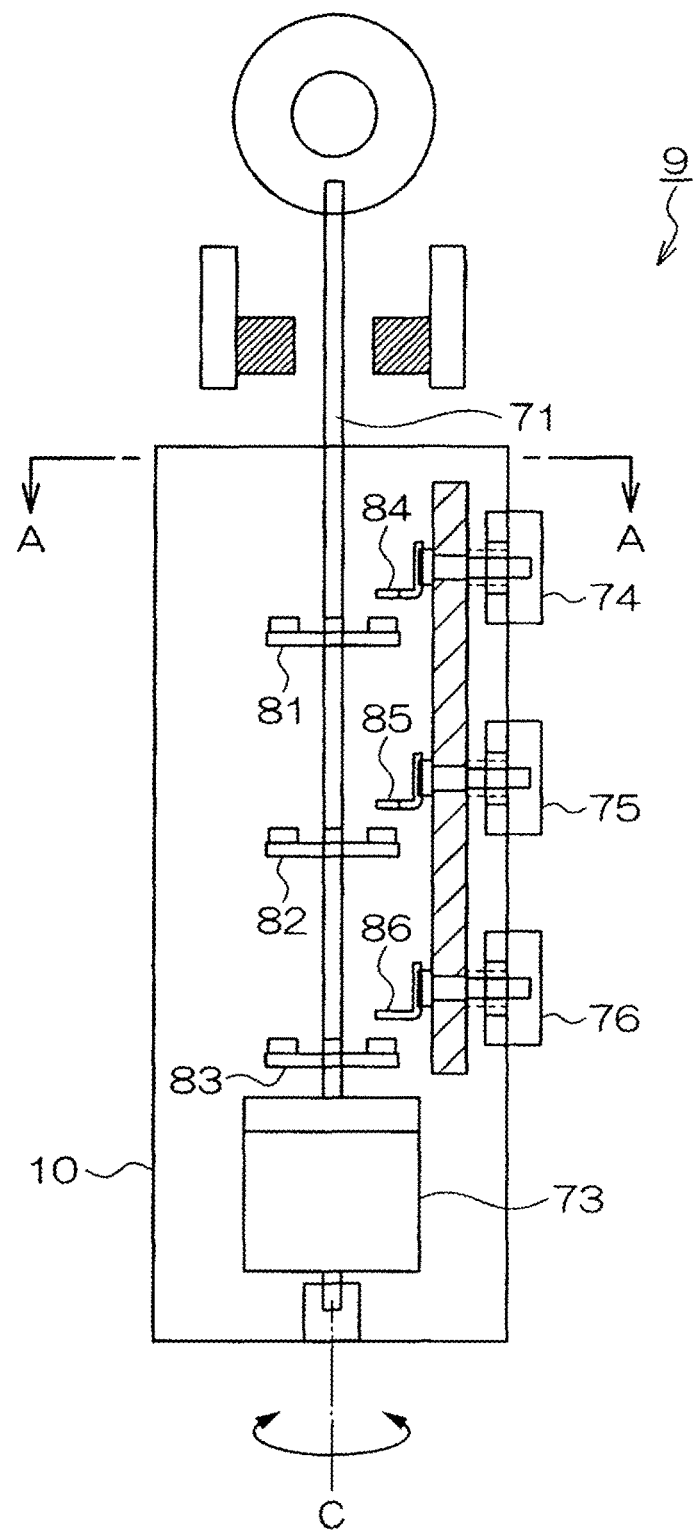
FIG. 18 is a vertical cross section showing a simplified configuration of a manipulation remote used in an overhead crane serving as the three-dimensional movement apparatus according to Embodiment 9.
Figure 19:
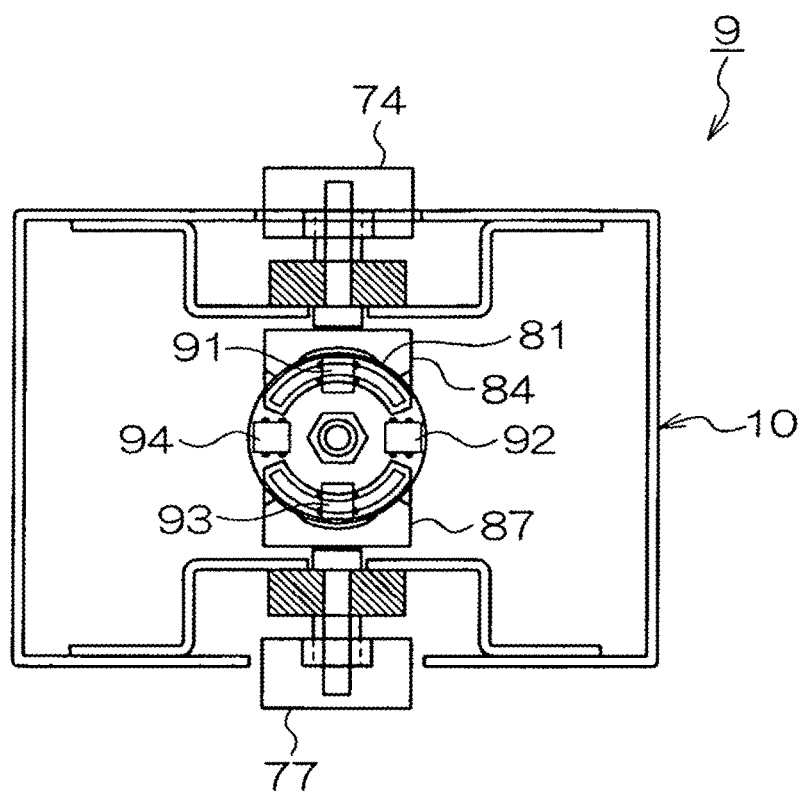
FIG. 19 is a cross section taken along line A-A in FIG. 18.
Figure 20:
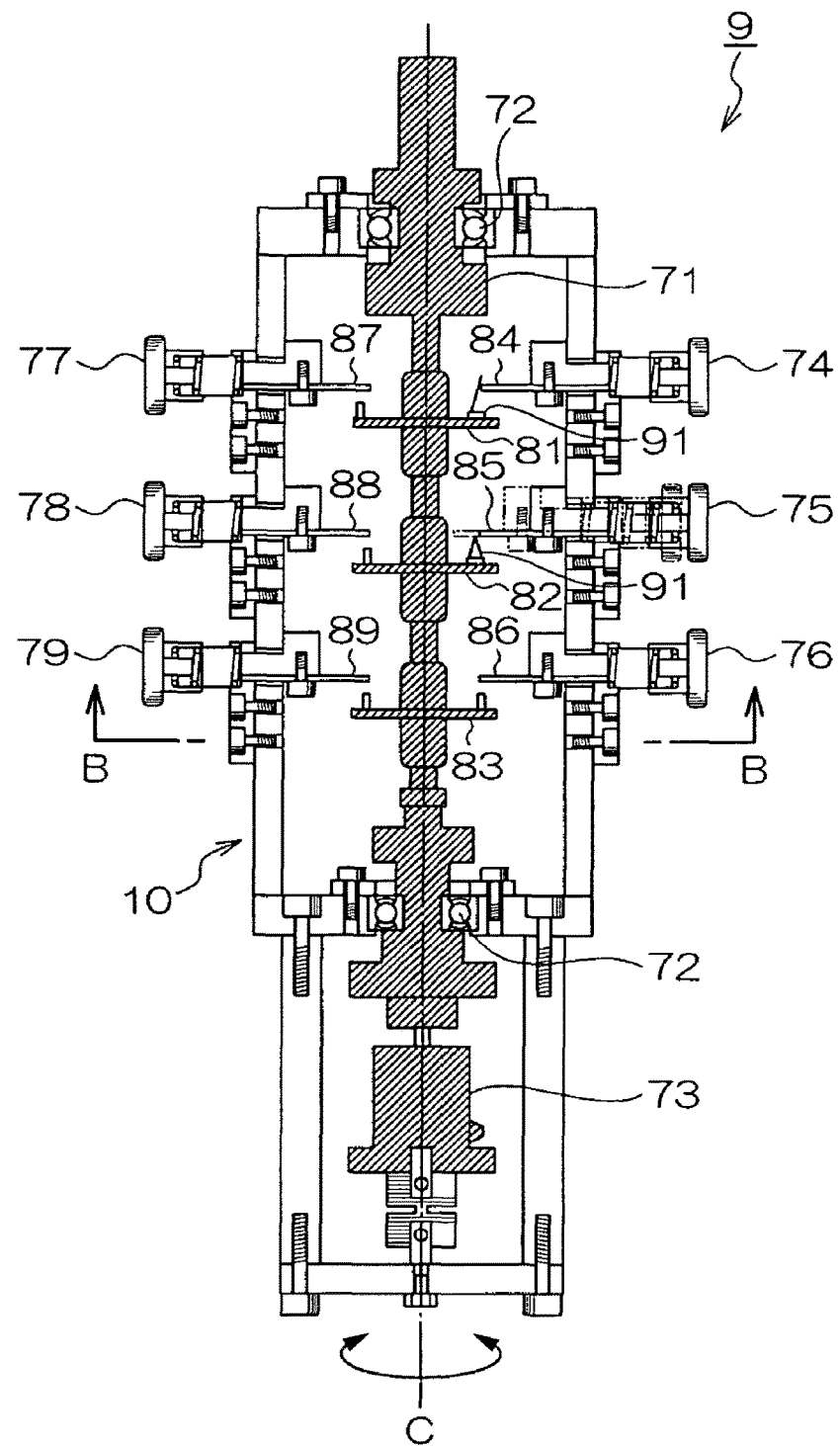
FIG. 20 is a vertically cut away end view of the manipulation remote of FIG. 18.
Figure 21A:
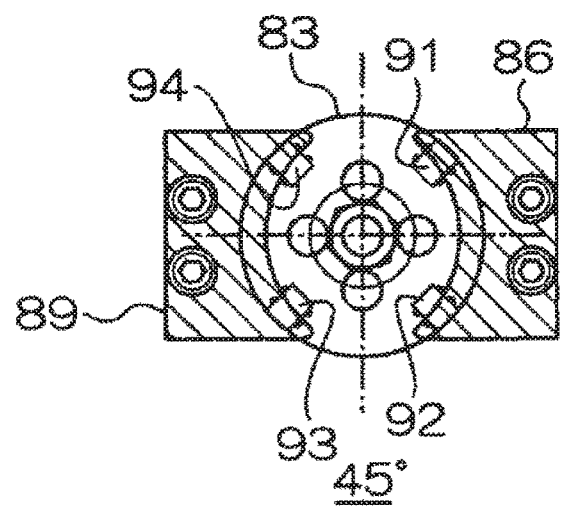
FIGS. 21A-C include cross sections taken along line B-B in FIG. 20 in various operational states.
Figure 21B:
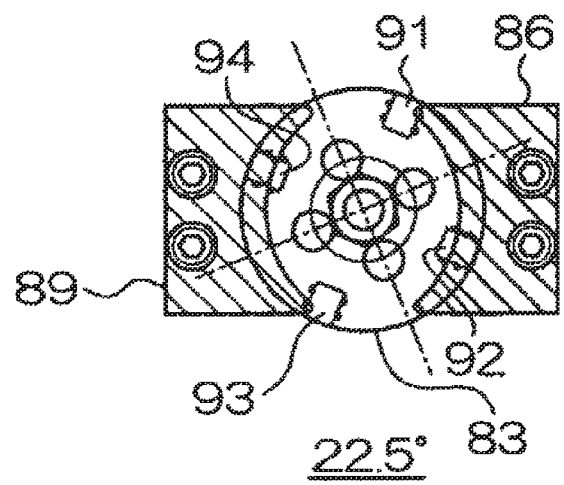
Figure 21C:
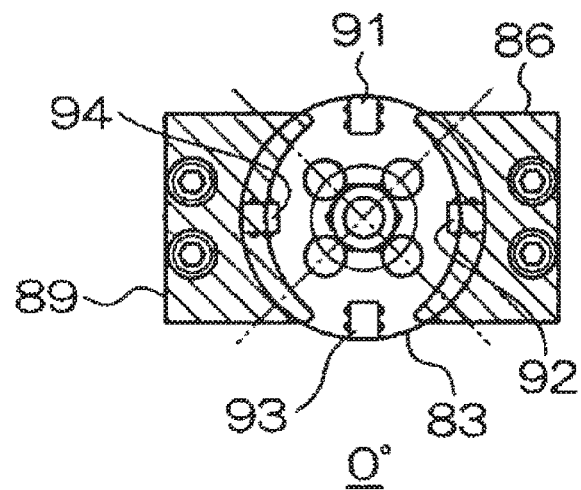
Figure 22A:
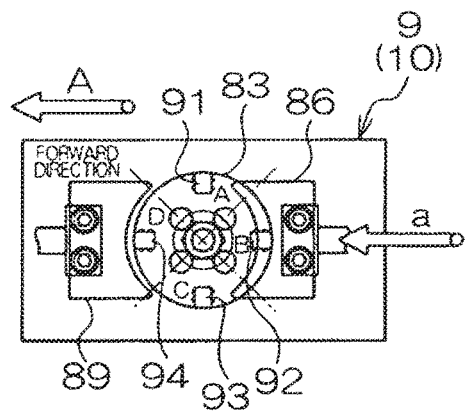
FIGS. 22A and 22B are diagrams illustrating the relationship between the pressing of the push button of the manipulation remote in FIG. 18 and the direction command.
Figure 22B:
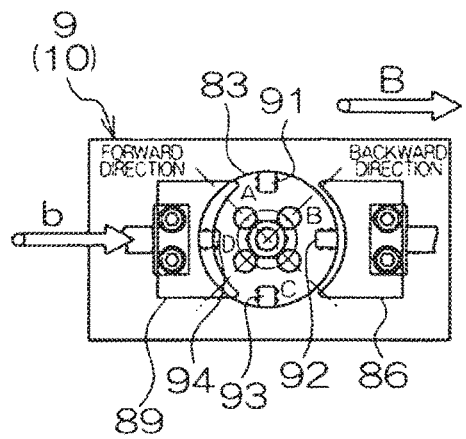
Figure 23A:
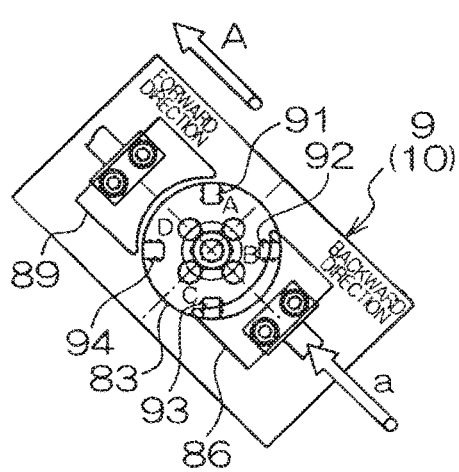
FIGS. 23A and 23B are diagrams illustrating the relationship between the pressing of the push button of the manipulation remote in FIG. 18 and the direction command.
Figure 23B:
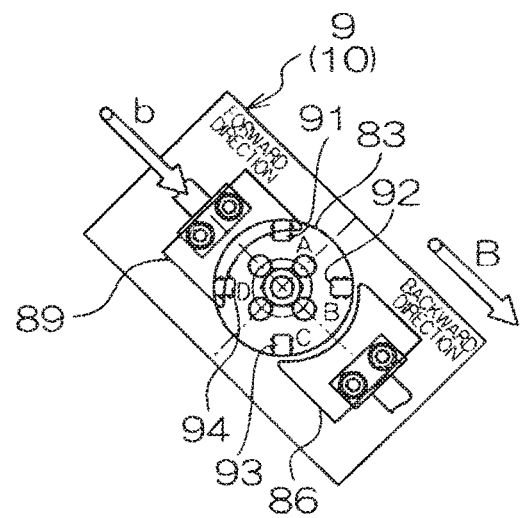
Figure 24:
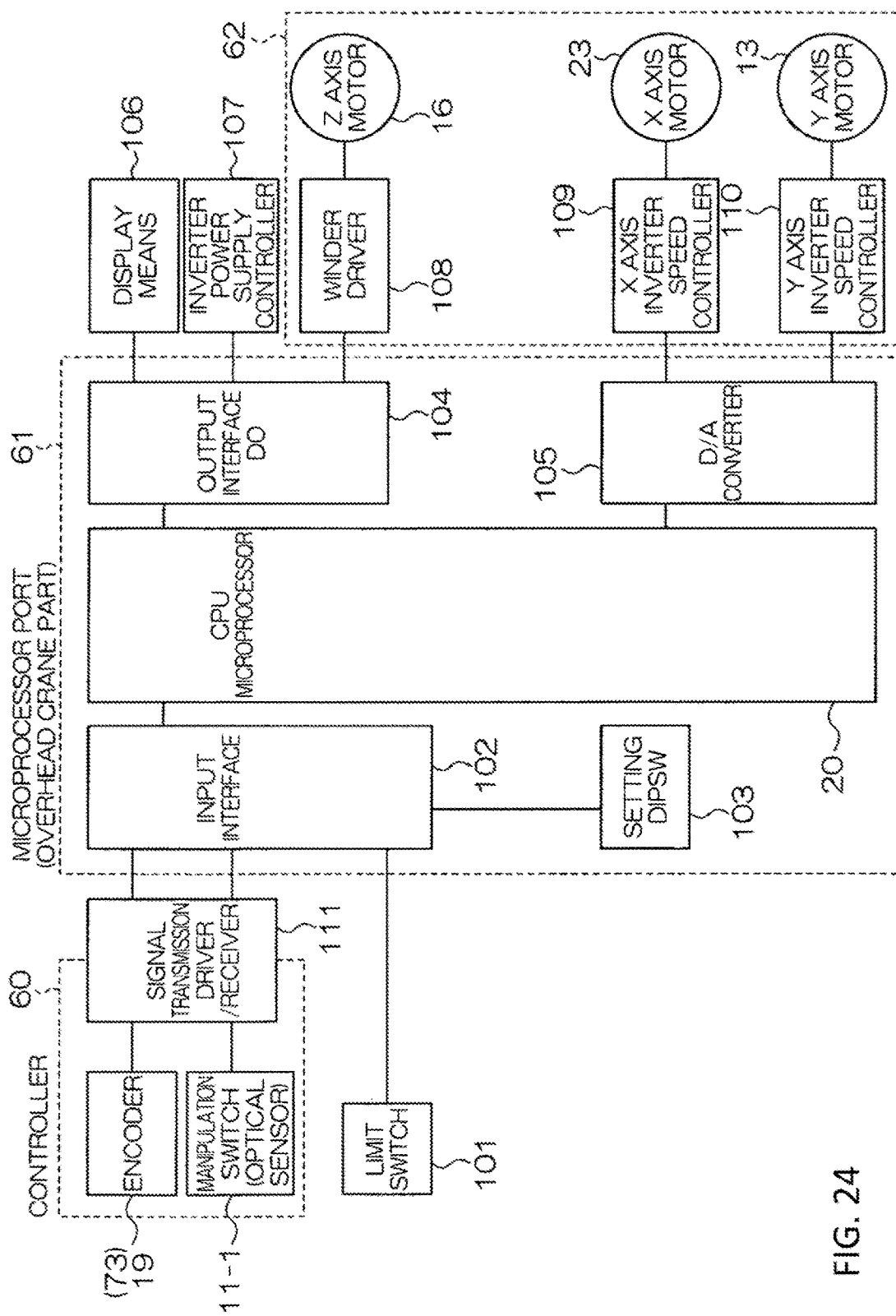
FIG. 24 is a block diagram of a control mechanism in an overhead crane serving as a three-dimensional movement apparatus according to an embodiment when optical sensors are incorporated into a manipulation remote.
Figure 25:
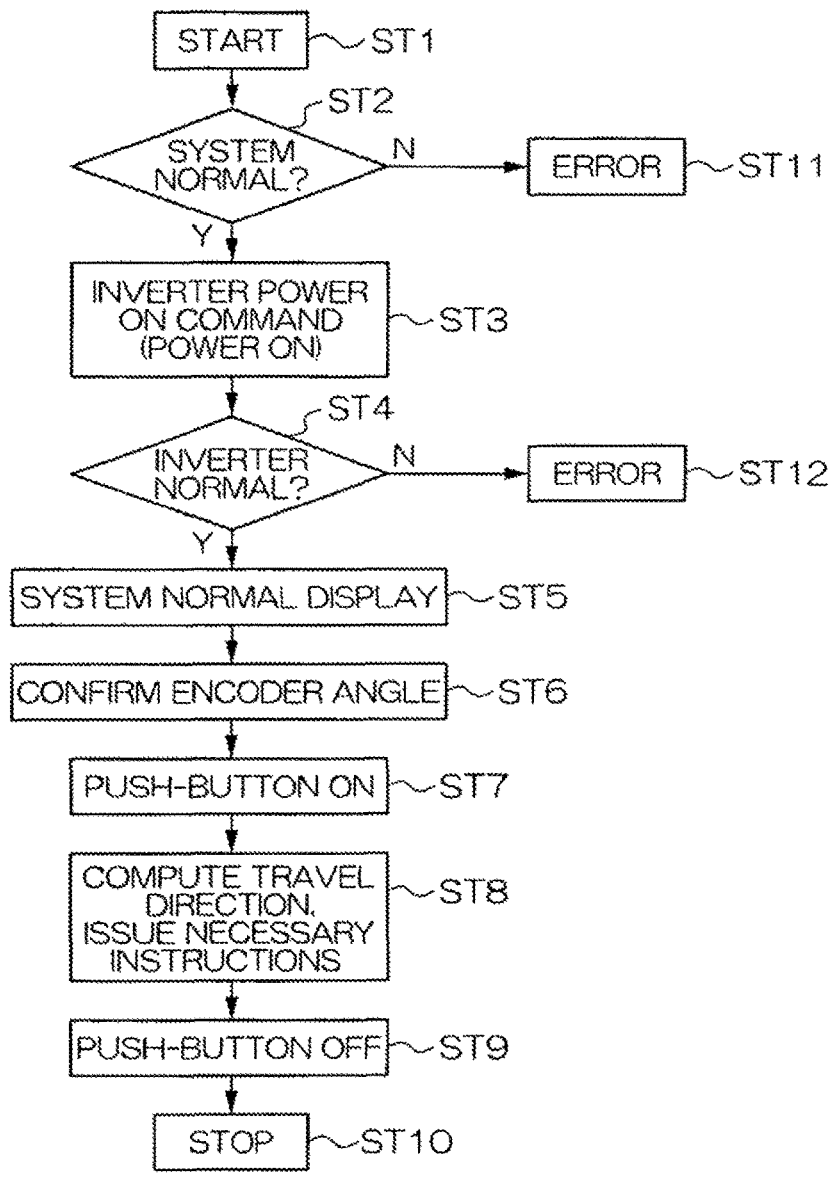
FIG. 25 is a flowchart showing an example of the manipulation of an overhead crane serving as the three-dimensional movement apparatus in FIG. 24.
Figure 26:
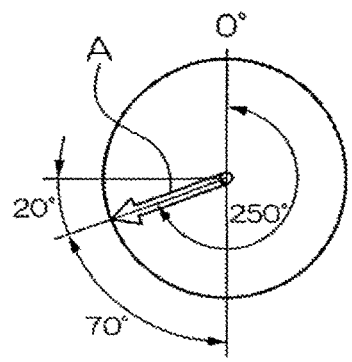
FIG. 26 is a diagram illustrating the computation of the driven voltage specified by the inverter in the manipulation of an overhead crane serving as the three-dimensional movement apparatus in FIG. 24.

What is claimed is:

1. A three-dimensional movement apparatus comprising:
a movement mechanism comprising an X-axis motor, a Y-axis motor, and a Z-axis motor, and configured to move a moving body in three dimensional directions via the X-axis motor, the Y-axis motor, and/or the Z-axis motor;
a controller that is configured to drive the X-axis motor, the Y-axis motor, and/or the Z-axis motor to thereby move the moving body to a desired location;
a cable; and
an operating device that is electrically coupled to the controller via the cable and configured to operate a movement of the moving body,
wherein the operating device comprises:
a main shaft coupled to the cable;
a casing having a surface and configured to be rotatable with respect to the main shaft;
at least one operating unit provided on the surface and configured to be operated by an operator of the three-dimensional movement apparatus; and
a plurality of detectors provided in the casing and configured to detect an operation to the at least one operating unit, the plurality of detectors being located in mutually different fixed positions with respect to the main shaft such that at least one detector of the plurality of detectors corresponding to a position of the at least one operating unit detects the operation to the at least one operating unit.

2. The three-dimensional movement apparatus according to claim 1,
wherein the at least one operating unit comprises a plurality of operating units, and
wherein the plurality of operating units are provided on the surface along the main shaft.

3. The three-dimensional movement apparatus according to claim 2,
wherein the surface comprises a first area and a second area, the second area being located in an opposite position to the first area in a direction perpendicular to an extension direction of the main shaft, and
wherein the plurality of operating units comprises a first operating unit located in the first area and a second operating unit located in the second area.

4. The three-dimensional movement apparatus according to claim 1, further comprising at least one plate member fixed to the main shaft, wherein the plurality of detectors is provided on the at least one plate member.

5. The three-dimensional movement apparatus according to claim 4, wherein the at least one plate member comprises a plurality of plate members arranged along the main shaft and fixed to the main shaft.

6. The three-dimensional movement apparatus according to claim 4, wherein the at least one plate member is in a disk shape.

7. The three-dimensional movement apparatus according to claim 1, wherein the main shaft is coupled to one end portion of the cable.

8. The three-dimensional movement apparatus according to claim 1, wherein the main shaft extends inside the casing.

9. The three-dimensional movement apparatus according to claim 1, wherein the casing is in a cuboid shape.

10. The three-dimensional movement apparatus according to claim 1, wherein the at least one operating unit comprises a plurality of operating units, and wherein a number of the plurality of operating units is smaller than a number of the plurality of detectors.

11. The three-dimensional movement apparatus according to claim 1, wherein the at least one operating unit is configured to be in a form of a push button.

12. The three-dimensional movement apparatus according to claim 1, wherein the movement mechanism is configured to be provided near a ceiling of a building.

13. The three-dimensional movement apparatus according to claim 1, wherein the cable is configured to bend but not twist.

14. The three-dimensional movement apparatus according to claim 1, wherein the cable comprises:

a communication wire; and a cable tube that is configured to house the communication wire therein.

15. The three-dimensional movement apparatus according to claim 1, wherein the cable is fixed to a rod-like member.

16. The three-dimensional movement apparatus according to claim 1, wherein the main shaft comprises one end portion, and wherein the operating device further comprises an encoder fixed to the one end portion of the main shaft.

* * * * *